US011219912B2

(12) United States Patent
Bharatiya et al.

(10) Patent No.: US 11,219,912 B2

(45) Date of Patent: Jan. 11, 2022

(54) PLUGGED SPRAYER/SPREADER DETECTION USING ELECTROMAGNETIC RADIATION

(71) Applicant: Deere & Company, Moline, IL (US)

(72) Inventors: Paresh Bharatiya, Maharashtra (IN); Raja Sivaji, Mazhaiyur (IN)

(73) Assignee: Deere & Company, Moline, IL (US)

( * ) Notice: Subject to any disclaimer, the term of this patent is extended or adjusted under 35 U.S.C. 154(b) by 29 days.

(21) Appl. No.: 16/401,628

(22) Filed: May 2, 2019

(65) Prior Publication Data

US 2019/0358661 A1 Nov. 28, 2019

Related U.S. Application Data

(63) Continuation-in-part of application No. 15/988,186, filed on May 24, 2018, and a continuation-in-part of application No. 16/210,209, filed on Dec. 5, 2018.

(51) Int. Cl.

*B05B 12/08* (2006.01)
*G01S 13/00* (2006.01)
(Continued)

(52) U.S. Cl.

CPC .......... *B05B 12/082* (2013.01); *G01S 13/003* (2013.01); *G01S 13/04* (2013.01);
(Continued)

(58) Field of Classification Search

CPC .............. A01M 9/0092; A01M 9/0007; A01M 21/043; G01S 13/003; A01C 15/04
See application file for complete search history.

(56) References Cited

U.S. PATENT DOCUMENTS

RE31,023 E 9/1982 Hall
4,767,062 A * 8/1988 Fletcher ................ A01C 15/04 239/151
(Continued)

FOREIGN PATENT DOCUMENTS

AU 2011203120 A1 1/2012
CN 106719551 A 5/2017
(Continued)

OTHER PUBLICATIONS

European Search Report issued in counterpart European Patent Application No. 19175919.0 dated Nov. 4, 2019 (11 pages).
(Continued)

*Primary Examiner* — Steven M Cernoch
(74) *Attorney, Agent, or Firm* — Joseph R. Kelly; Kelly, Holt & Christenson PLLC

(57) ABSTRACT

An agricultural spreader includes at least one delivery conduit that carries material to be spread from a bin to an exit end of the delivery conduit under the influence of air blown through the delivery conduit by a fan. A deflector is mounted proximate the exit end of the delivery pipe and deflects the material onto agricultural field in a dispersal area. A radio frequency (RF) transmitter is disposed to generate an RF signal that passes through the dispersal area. The RF signal is detectably changed when interacting with the material passing through the dispersal area. An RF receiver is disposed to receive the RF signal after the RF signal passes through the dispersal area and provides an output indicative of the RF signal. A controller is coupled to RF receiver and detects plugging of the delivery conduit based on the output of the RF receiver.

20 Claims, 19 Drawing Sheets

(51) Int. Cl.

| | |
|---|---|
| ***G01S 13/04*** | (2006.01) |
| *A01C 15/04* | (2006.01) |
| *A01M 9/00* | (2006.01) |
| *A01M 21/04* | (2006.01) |

(52) U.S. Cl.

CPC ............ *A01C 15/04* (2013.01); *A01M 9/0007* (2013.01); *A01M 9/0092* (2013.01); *A01M 21/043* (2013.01)

(56) References Cited

U.S. PATENT DOCUMENTS

| | | | |
|---|---|---|---|
| 4,905,897 | A | 3/1990 | Rogers et al. |
| 5,927,603 | A | 7/1999 | McNabb |
| 7,311,004 | B2 | 12/2007 | Giles |
| 8,191,798 | B2 | 6/2012 | Hahn et al. |
| 8,833,680 | B2 | 9/2014 | Ellingson et al. |
| 8,942,893 | B2 | 1/2015 | Rosa et al. |
| 9,532,563 | B2 | 1/2017 | Arenson et al. |
| 9,740,208 | B2 | 8/2017 | Sugumaran et al. |
| 9,824,438 | B2 | 11/2017 | Reichhardt |
| 10,391,510 | B2 | 8/2019 | Posselius et al. |
| 2006/0265106 | A1 | 11/2006 | Giles et al. |
| 2010/0264163 | A1 | 10/2010 | Teves et al. |
| 2012/0000991 | A1 | 1/2012 | Hloben |
| 2012/0168530 | A1 | 7/2012 | Ellingson et al. |
| 2013/0211628 | A1 | 8/2013 | Thurow et al. |
| 2014/0049395 | A1 | 2/2014 | Hui et al. |
| 2014/0263713 | A1 | 9/2014 | Stocklin et al. |
| 2015/0367358 | A1 | 12/2015 | Funseth et al. |
| 2015/0375247 | A1 | 12/2015 | Funseth et al. |
| 2018/0036755 | A1 | 2/2018 | Illemann et al. |
| 2018/0129879 | A1 | 5/2018 | Achtelik et al. |
| 2019/0357518 | A1 | 11/2019 | Bharatiya et al. |
| 2019/0358660 | A1 | 11/2019 | Paralikar et al. |

FOREIGN PATENT DOCUMENTS

| | | | | | |
|---|---|---|---|---|---|
| CN | 107284672 | A | | 10/2017 | |
| DE | 102015111889 | A1 | | 1/2017 | |
| EP | 1359406 | A1 | | 11/2003 | |
| EP | 2893795 | A1 | | 7/2015 | |
| EP | 3248463 | A1 | * | 11/2017 | ............. A01M 7/00 |
| EP | 3366129 | A1 | | 8/2018 | |
| FR | 2843279 | A1 | | 2/2004 | |
| JP | H0599802 | A | | 4/1993 | |
| WO | WO2012012318 | A2 | | 1/2012 | |
| WO | WO2014067785 | A1 | | 5/2014 | |

OTHER PUBLICATIONS

European Search Report issued in counterpart European Patent Application No. 19175418.3 dated Nov. 4, 2019 (10 pages).

European Search Report issued in counterpart European Patent Application No. 19175914.1 dated Nov. 4, 2019 (11 pages).

Jiao Leizi et al., Monitoring spray drift in aerial spray application based on infrared thermal imaging technology, Computers and Electronics in Agriculture, Elsevier, Amsterdam, NL, vol. 121, Dec. 30, 2015 (Dec. 30, 2015), pp. 135-140.

U.S. Appl. No. 15/988,185, filed May 24, 2018, Application and Drawings, 27 pages.

European Search Report issued in counterpart application No. 19175914.1 dated Apr. 15, 2020 (05 pages).

Prosecution History for U.S. Appl. No. 15/988,186 including: Non-Final Office Action dated Apr. 2, 2021, and Restriction Requirement dated Dec. 10, 2019, 23 pages.

Non-Final Office Action for U.S. Appl. No. 16/210,209 dated May 6, 2021, 18 pages.

U.S. Appl. No. 15/988,186, filed May 24, 2018, prosecution History as of Feb. 2, 2021, 117 pages.

U.S. Appl. No. 16/210,209, filed Dec. 5, 2018, prosecution history as of Feb. 2, 2021, 102 pages.

* cited by examiner

PLUGGED SPRAYER/SPREADER DETECTION USING ELECTROMAGNETIC RADIATION

CROSS-REFERENCE TO RELATED APPLICATIONS

The present application is based on and claims the benefit of U.S. patent application Ser. No. 15/988,186 filed on May 24, 2018, and Ser. No. 16/210,209 filed on Dec. 5, 2018 the content of which are hereby incorporated by reference in its entirety.

FIELD OF THE DESCRIPTION

This description relates to a spraying and/or a spreading apparatus for applying material to an agricultural field. More specifically, the description relates to detecting full or partial plugging of a spray nozzle of an agricultural sprayer and/or a pipe or deflector of an agricultural spreader.

BACKGROUND

Agricultural spraying and spreading systems are known. Such systems typically include a delivery line or conduit mounted on a foldable, hinged, or retractable and extendible boom. In a sprayer, the delivery line is coupled to one or more spray nozzles mounted along the boom. Each spray nozzle is configured to receive the fluid and direct atomized fluid to a crop or field during application.

Spraying operations are generally intended to distribute a product (e.g. fertilizer, herbicides, pesticides, etc.) evenly over an agricultural surface, such as a field or crop. Properly functioning spray nozzles ensure that dispersal of the product occurs evenly and is important to ensure crop yields.

In an agricultural spreader, the material to be applied (e.g., fertilizer, pesticide, herbicide, etc.) is held in a bin, and is a dry material, which may be particulate (e.g., granular). A conveyor carries the dry material from the bin to an outlet which feeds the material into a series of conduits (e.g., tubes or pipes) which extend outwardly along the boom. A fan generates pressurized air in the conduits to move the dry product outwardly, through the pipes, to an exit end of the pipes. A deflector is disposed proximate the exit end of each pipe to deflect the dry material downwardly onto the field where it is being applied.

SUMMARY

An agricultural spreader includes at least one delivery conduit that carries material to be spread from a bin to an exit end of the delivery conduit under the influence of air blown through the delivery conduit by a fan. A deflector is mounted proximate the exit end of the delivery conduit and deflects the material onto an agricultural field in a dispersal area. A radio frequency (RF) transmitter is disposed to generate an RF signal that passes through the dispersal area. The RF signal is detectably changed when interacting with the material passing through the dispersal area. An RF receiver is disposed to receive the RF signal after the RF signal passes through the dispersal area and provides an output indicative of the RF signal. A controller is coupled to the RF receiver and detects plugging of the delivery conduit based on the output of the RF receiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Examples described herein generally employ electromagnetic radiation to detect a change in output from one or more spray nozzles or delivery conduits (e.g., pipes). In one example, the electromagnetic radiation is in the form of radio-frequency transmissions. As the radio-frequency energy of the transmission passes through the droplets generated by the spray nozzle, or the material being spread from a delivery pipe and deflector, the RF signal is changed in a detectable way. An RF receiver, configured to detect the RF signal that has passed through the spray, or dry material, provides an output that is monitored to provide diagnostic indications. As used herein, radio-frequency (RF) is defined to mean electromagnetic energy having a frequency in the range from about 3 kHz to about 300 GHz.

In another example, the electromagnetic radiation is in the form of thermal imaging that is used to view a thermal change on the agricultural surface or crop upon receiving an applied liquid spray.

Figure 1:
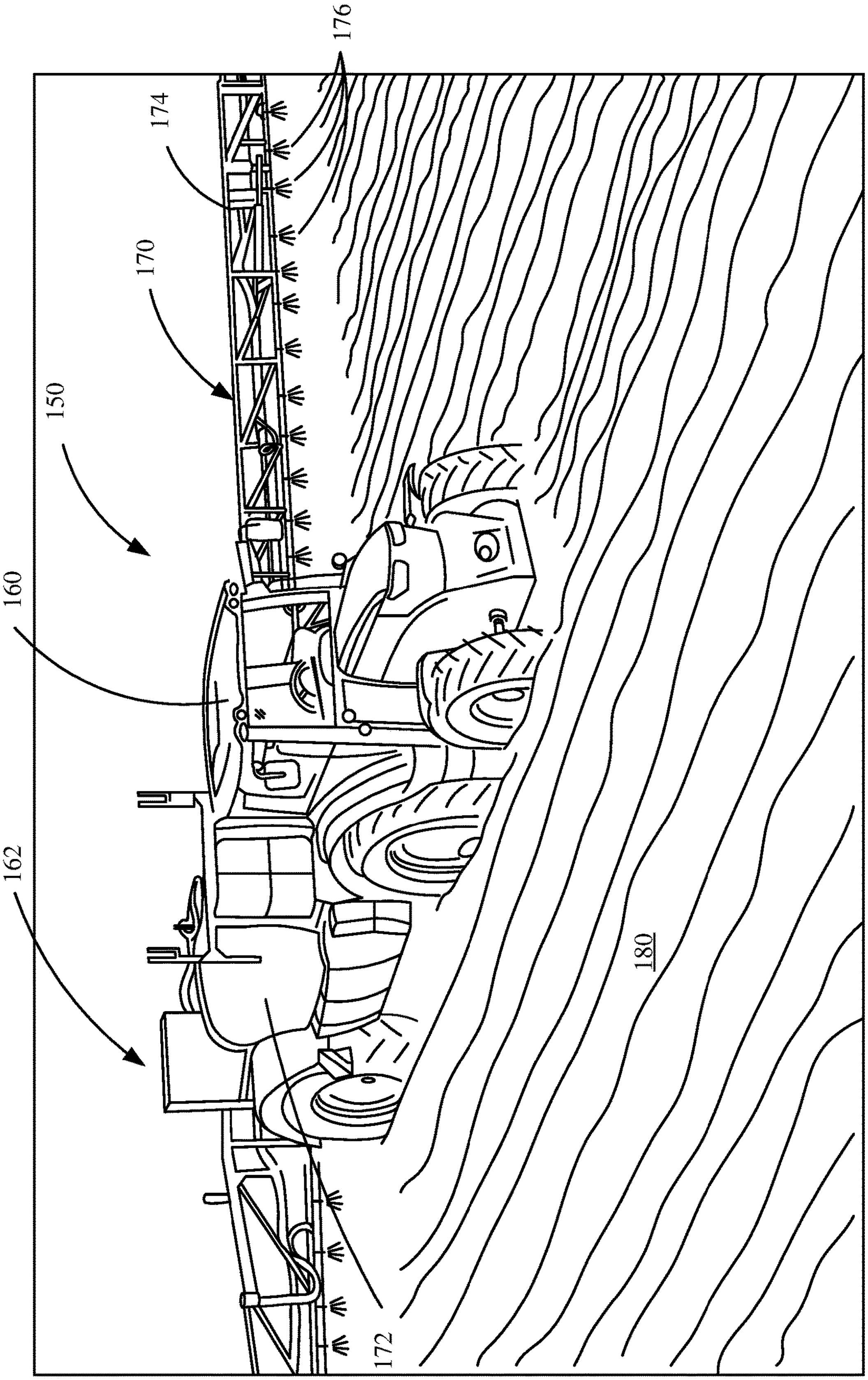
FIG. 1 illustrates an agricultural field sprayer with which examples described herein are particularly useful.

FIG. 1 illustrates an agricultural field sprayer with which examples described herein can be used. FIG. 1 illustrates an agricultural environment 150 in which a tractor 160 is coupled to, and pulls, a towed sprayer 162. Towed sprayer 162 includes spray system 170, which has a tank 172 containing a liquid that is being applied to field 180. Tank 172 is coupled to boom 174, and the product is delivered to spray nozzles 176, which are spaced apart along boom 174. It is important, in environment 150, that product is evenly distributed across field 180. For example, if fertilizer is unevenly applied, it is wasted in areas of over-application, and areas of under-application can see reduced yields.

Figure 2A:
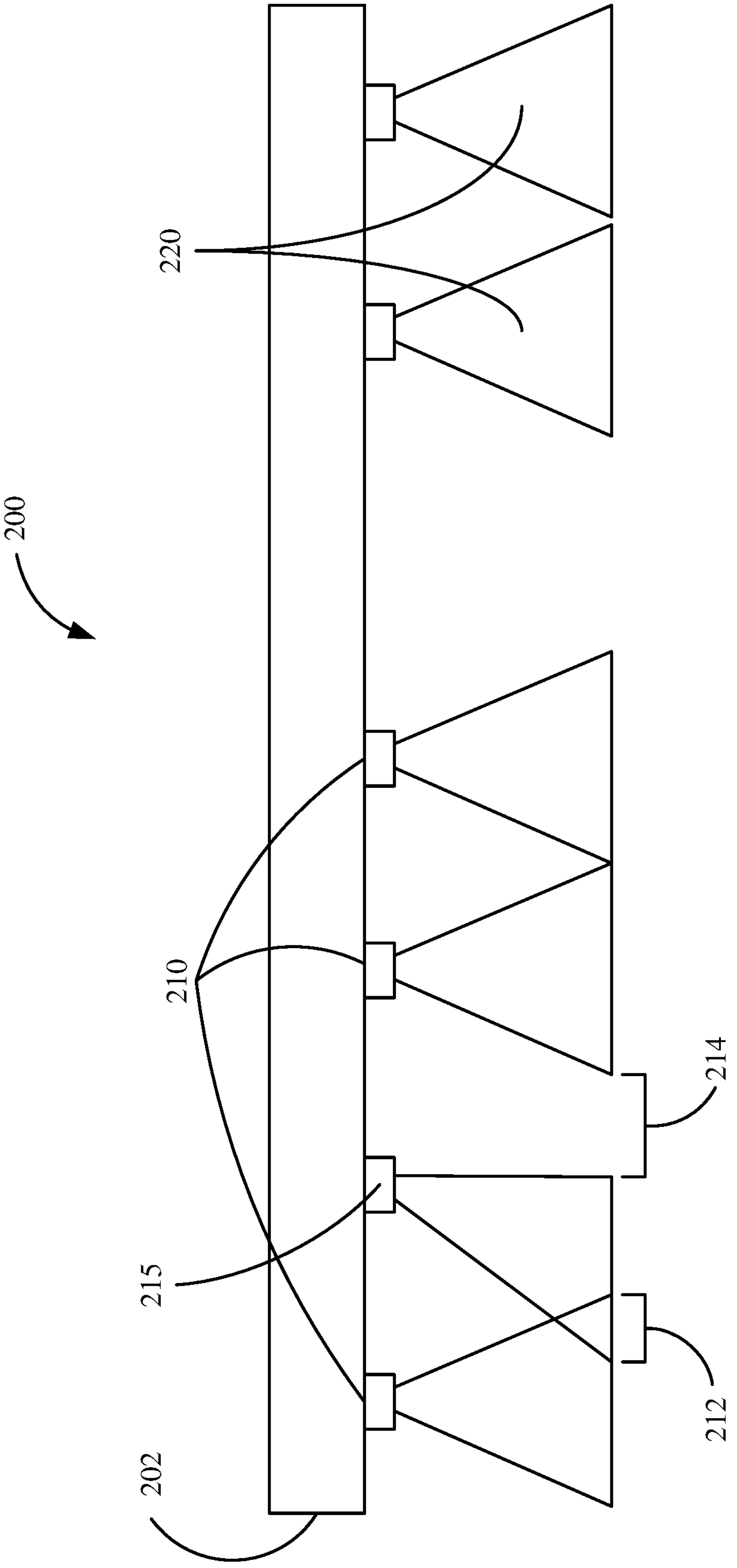
FIGS. 2A-2C illustrate example spray patterns from spray nozzles within a spray system.
Figure 2B:
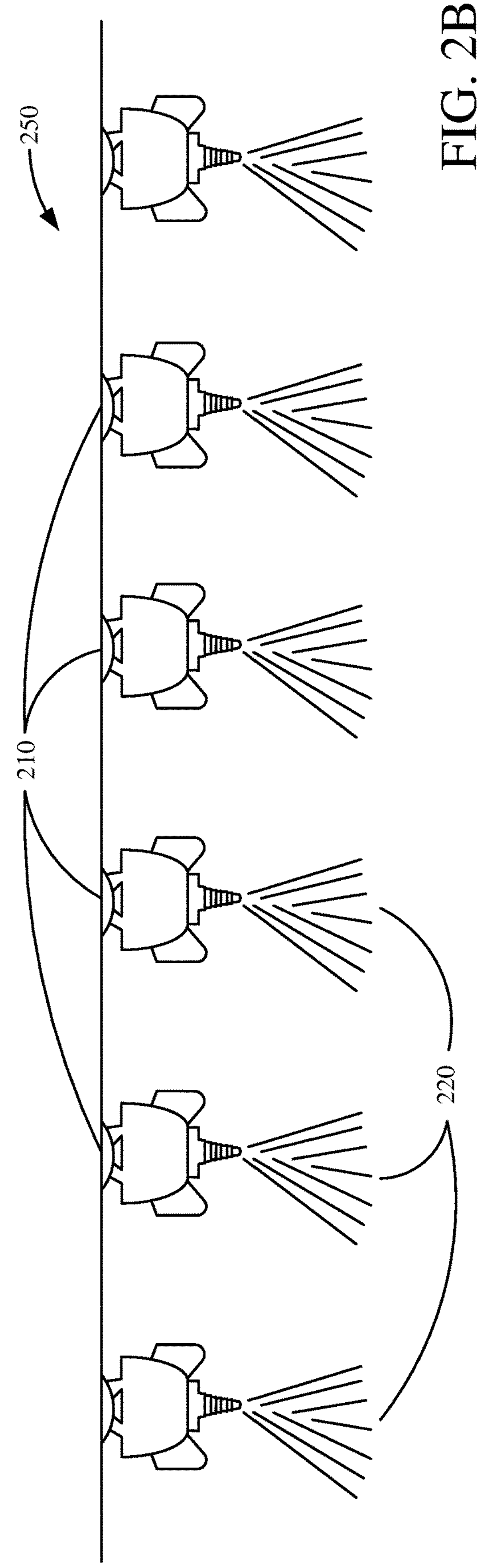
Figure 2C:
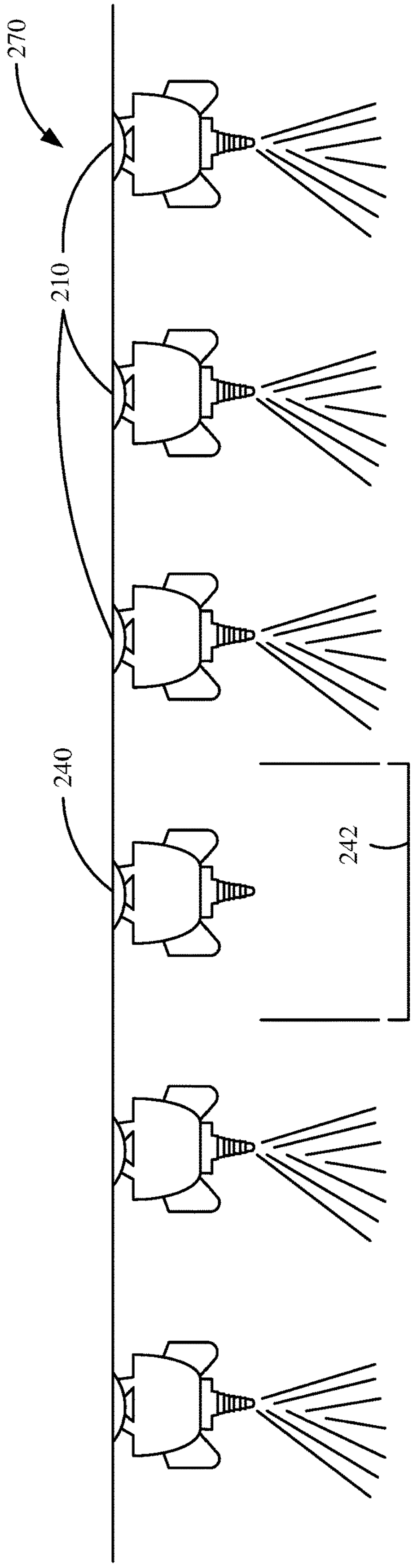

FIGS. 2A-2C illustrate example spray patterns from spray nozzles within a spray system. FIG. 2A is a diagrammatic representation of an example spray system 200 having a number of spray nozzles 210 spaced apart along boom 202. Each spray nozzle 210 generates a dispersal 220 of sprayed or otherwise atomized product. As illustrated in FIG. 2A, spray nozzle 215 is at least partially plugged, creating an overlap area 212, where distributed product is overapplied, and an uncovered area 214, where no product is applied.

FIGS. 2B and 2C illustrate a contrast between a properly functioning spray system 250 and a spray system 270 that has a plugged spray nozzle 240. As illustrated in FIG. 2C, because spray nozzle 240 is fully plugged, area 242 will receive no dispersed product. This can result in lower yield for the portion of the field covered by area 242. Additionally, a plugged spray nozzle also impacts the spray quality as the target application rate is not achieved for a portion of the field.

Figure 3A:
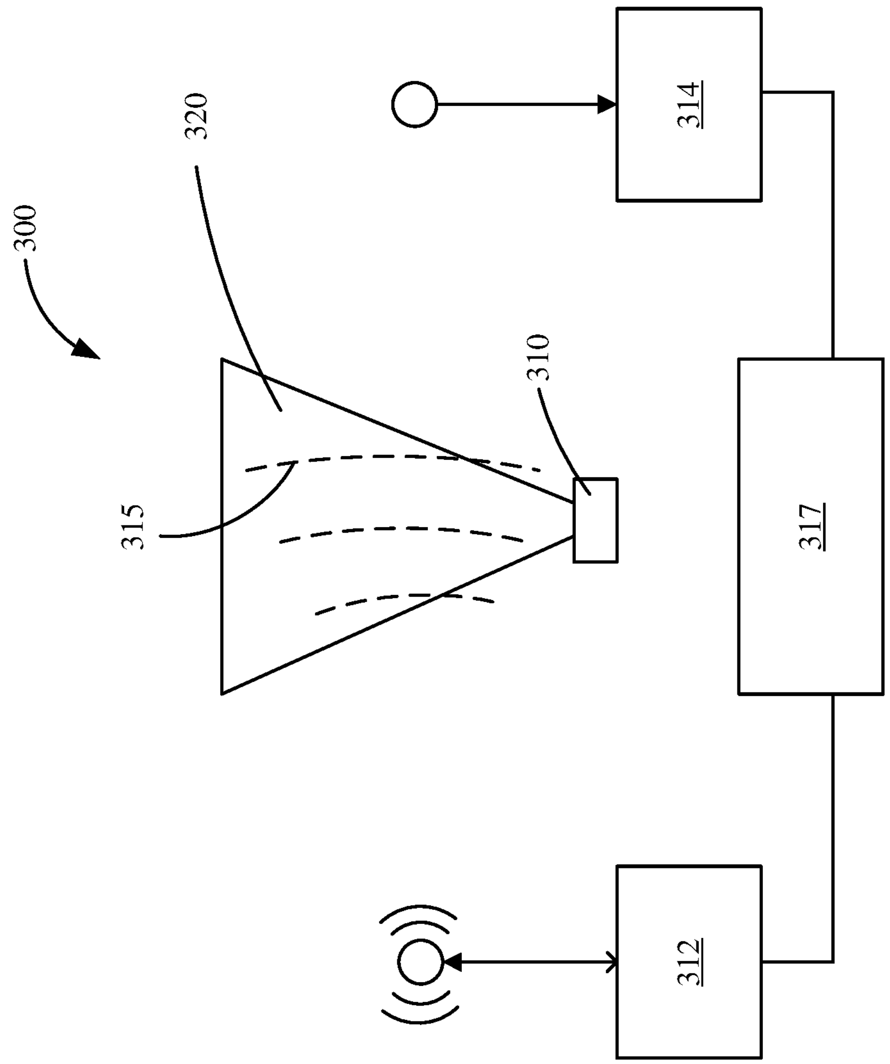
FIGS. 3A and 3B illustrate systems for detecting spray nozzle plugging in accordance with an example of the present description.
Figure 3B:
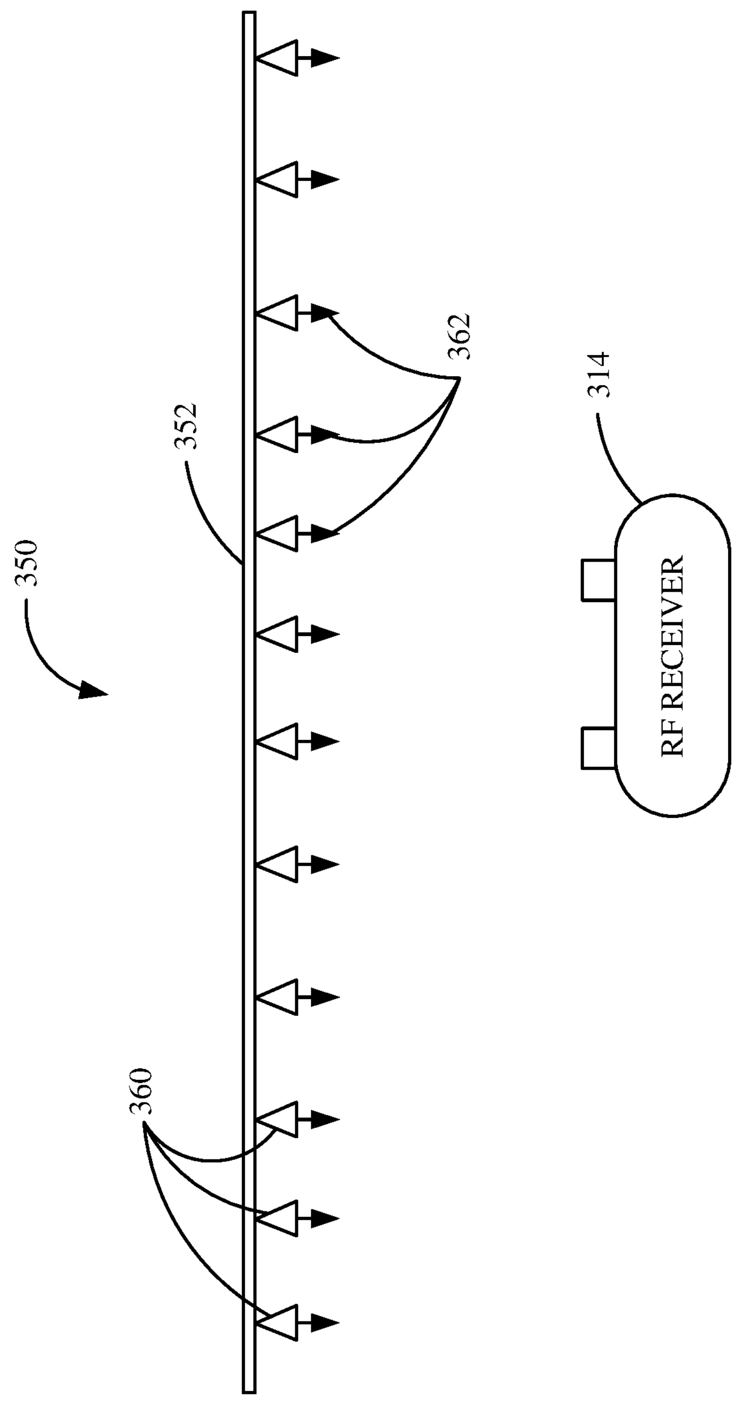

FIGS. 3A and 3B illustrate systems for detecting spray nozzle plugging in accordance with an embodiment of the present invention. FIG. 3A is a diagrammatic view of RF-based plugged nozzle detection in accordance with one example. Nozzle 310, when functioning properly, emits product in a predictable dispersal pattern 320. An RF transmission 315, sent from signal transmitter 312, passes through dispersal pattern 320, and is detected by RF signal detector 314. The RF signal 315 is detectably changed as it passes through dispersal pattern 320. This detectable change is generally a change in the attenuation of the signal. Thus, controller 317 coupled to transmitter 312 and receiver 314, can detect a change in the received signal by monitoring one or more characteristics of the RF signal (such as amplitude) using receiver 314. In this way, controller 317 detects changes indicative of plugging and provides a useful ability to diagnose, and/or correct, a plugged nozzle quickly. Controller 317 can be any suitable logic or circuit arrangements that are able to receive an output signal from receiver 314 and analyze the output to detect partial or full nozzle plugging. In one example, controller 317 is a microprocessor. Controller 317 may be separate from each of transmitter 312 and receiver 314 or it may be combined with either of transmitter 312 or receiver 314. Advantageously, the techniques described herein employ RF energy to detect spray nozzle plugging and thus do not employ optical techniques, which can be distorted or otherwise affected by dirt, dust, darkness or other variables.

One example of electromagnetic energy being affected by passing through droplets of liquid is known as rain fade. Rain fade describes the attenuation of the RF signal as it passes through and is at least partially absorbed by atmospheric snow, ice or rain. Rain fade is particularly evident at RF frequencies above 11 GHz and is typically a quantity that is compensated for in electromagnetic transmissions. One particularly useful range of RF signals for embodiments described herein is a frequency range from about 7 GHz to about 55 GHz.

FIG. 3B illustrates a spray system 350 for a plurality of nozzles 360 mounted on boom 352. In the illustrated example, each nozzle 360 is paired with an RF signal transmitter (not shown) that emits a signal 362. In one example, each transmitter transmits a signal of the same amplitude but with a different frequency to that the RF receiver can differentiate the various signals. The RF transmitters can be positioned close to each of nozzles 360, such that each RF signal will pass through the dispersal pattern of its respective nozzle and be received by RF signal receiver 314. For example, the signal transmitters can be placed next to each nozzle 360, as well as above or below each nozzle 360 as long as the RF signal passes through the dispersal pattern of the respective nozzle. Thus, the signal transmitters can be mounted directly to boom 352, or to each of nozzles 360, or in other appropriate locations.

In one example, RF receiver 314 is configured to substantially simultaneously receive RF signals relative to each of nozzles 360. However, it is also contemplated that RF receiver 314 may be configured to alternatively receive and analyze incoming RF signals relative to each nozzle 360 sequentially. The system, thus is able to provide a substantially real-time indication of the current efficacy of each nozzle during operation.

Figure 4A:
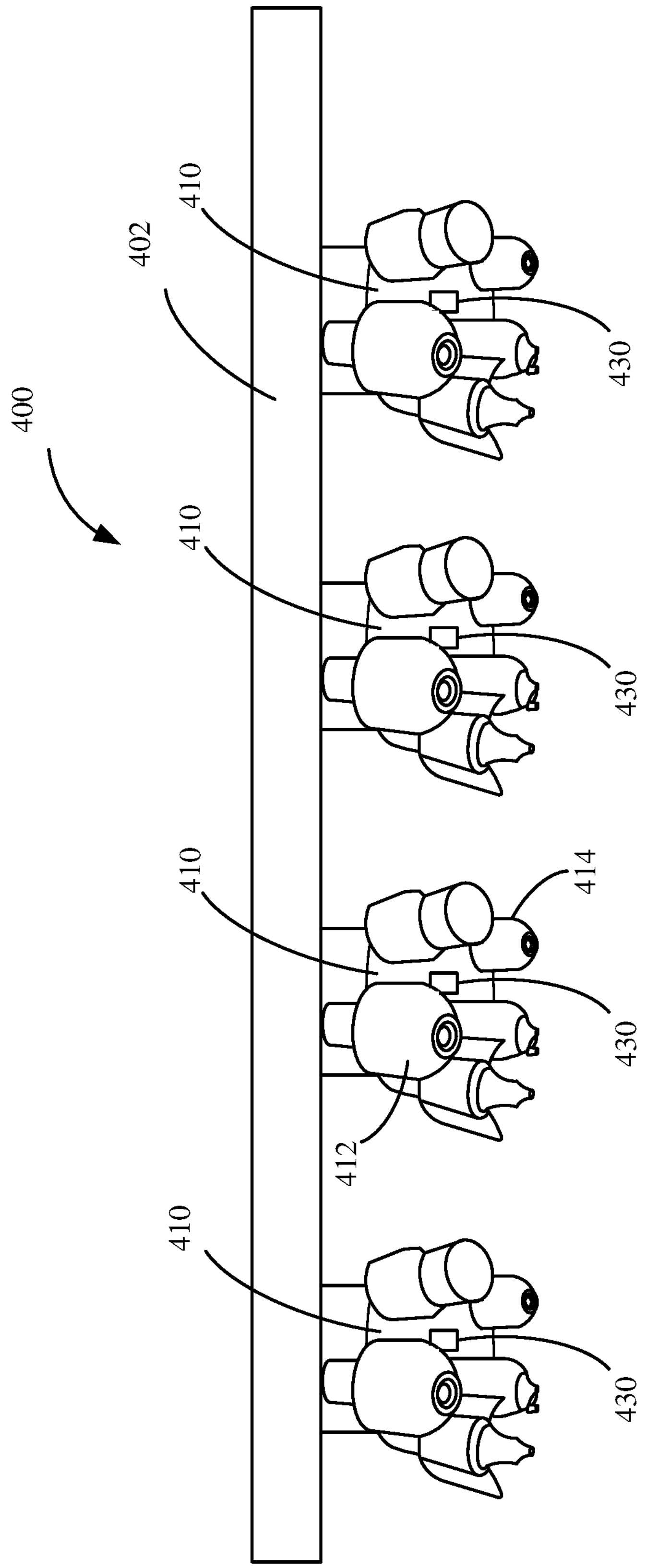
FIGS. 4A and 4B illustrate a multi-nozzle system employing RF-based plugging detection in accordance with an example of the present description.

FIG. 4A illustrates a multi-nozzle spray system employing RF-based plugging detection in accordance with an example of the present description. System 400 includes a boom 402 coupled to a plurality of multi-nozzle bodies 410. In one example, multi-nozzle bodies 410 are used to deliver effective coverage over more area in less time. Using multiple nozzles allow an increase in productivity by better tolerating changes in spray speed. The group of nozzles can be used to deliver a single product at varying rates depending on how many individual nozzles are engaged. Additionally, the utilization of various nozzles can provide better placement precision of the product. In one example, multi-nozzle bodies 410 are those sold in relation to the trade designation ExactApply™ Nozzle Control, available from John Deere Corporation, of Moline, Ill.

As shown, each multi-nozzle body 410 is configured to mount a plurality of spray nozzles, such as first nozzle 412 and a second nozzle 414. First nozzle 412 and second nozzle 414 are diametrically opposite one another on multi-nozzle body 410. As illustrated in FIG. 4A, a multi-nozzle body 410 can be coupled to more than two nozzles; for example, FIG. 4A shows five nozzles for each multi-nozzle body 410. Each multi-nozzle body 410 also includes, or is coupled to, an RF transmitter 430 that is configured to emit an RF signal. In one example, the RF signal is omnidirectional emanating outwardly from the center of multi-nozzle body 410. As can be appreciated, the RF signal will pass through the dispersal patterns of any individual nozzles that are engaged. The RF signal passing through the droplets of each dispersal pattern will be attenuated, or otherwise affected. An RF receiver positioned to detect the RF signal after passing through such a dispersal pattern is then used to detect whether a particular nozzle's pattern has changed.

Figure 4B:
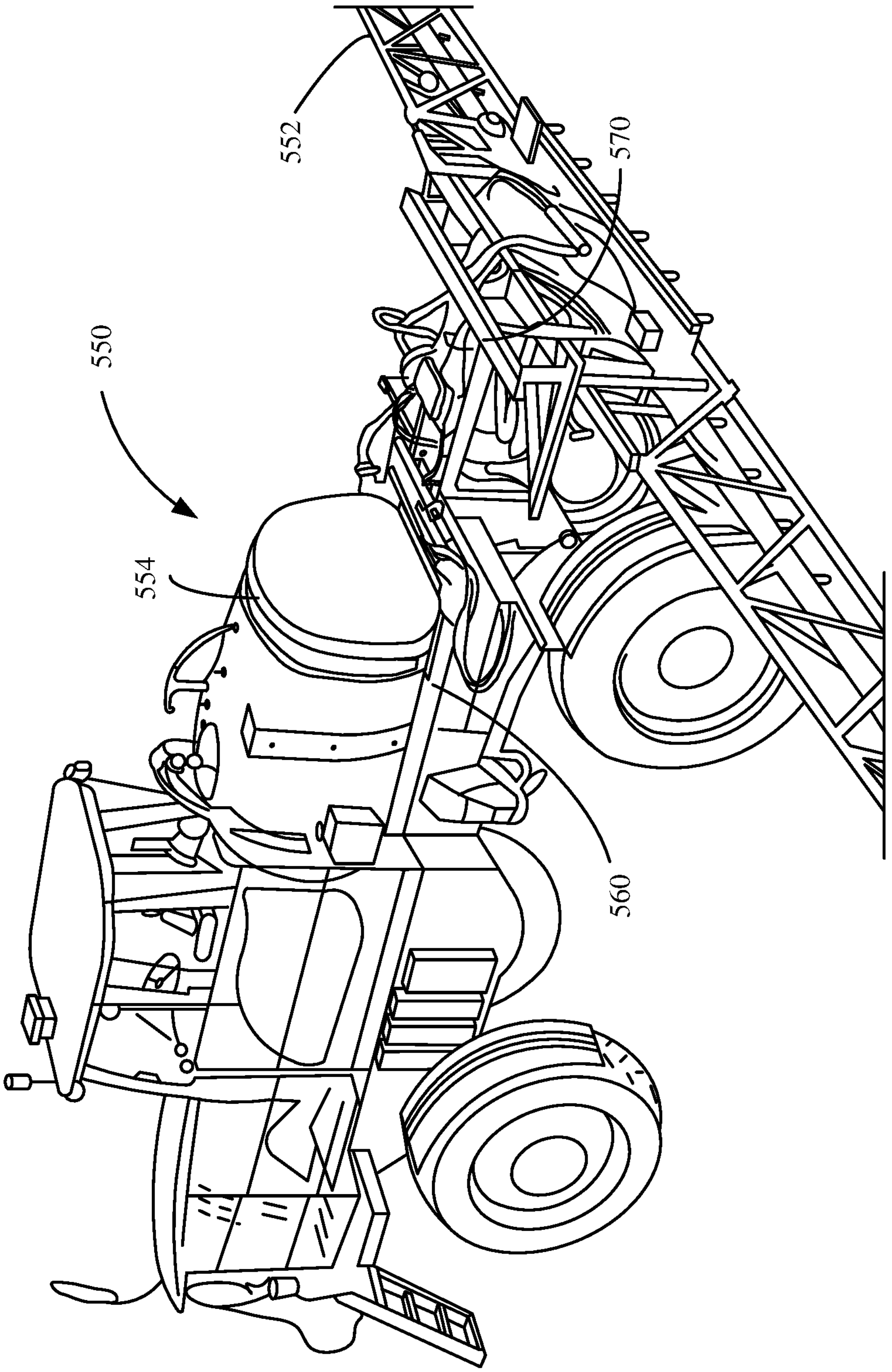

FIG. 4B illustrates an agricultural sprayer 550 with a pair of RF receivers 560, 570 to receive RF signals relative to multiple individual nozzles of a multi-nozzle body 410 in accordance with an embodiment of the present invention. As illustrated in FIG. 4B, first RF receiver 560 is mounted near solution tank 554, and second RF receiver 570 is located on the back side of a boom 552. Both first and second receivers 560, 570, receive the same signal from each multi-nozzle body RF transmitter 430. However, the signal received by first RF receiver 560 will be attenuated by the nozzle 412 (shown in FIG. 4A) while the signal received by second RF receiver 570 will be attenuated by nozzle 414 (shown in FIG. 4A). First and second receivers 560, 570 are coupled to a suitable controller, such as a controller of the agricultural machine, which analyzes the received signals to provide a plugging indication relative to the various nozzles, such as nozzles 412, and 414. This analysis may be as simple as merely comparing the two signals, such that any difference between the two signals can be used to indicate which nozzle of the pair of nozzles is plugged, either partially or fully.

Figure 5A:
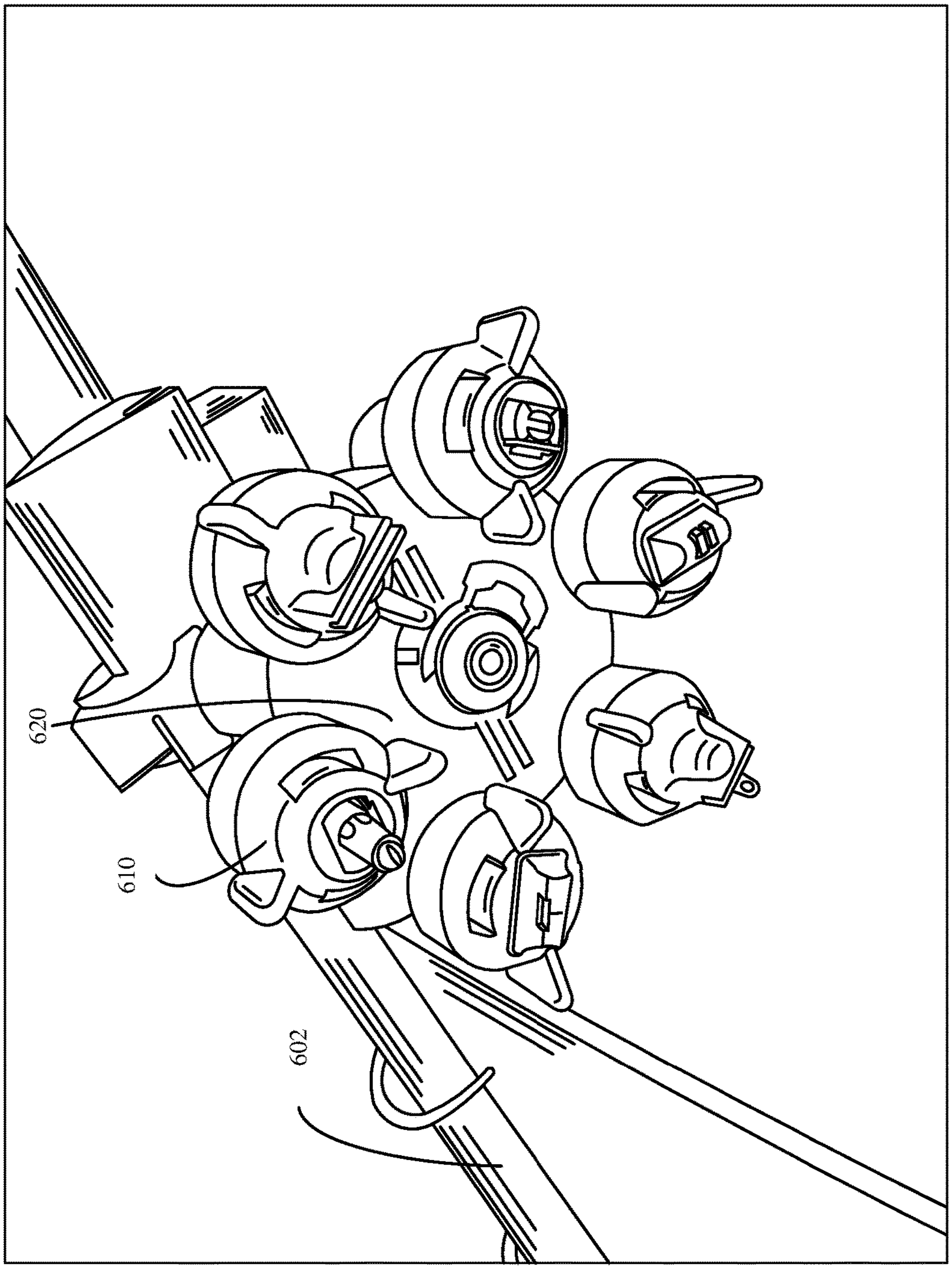
FIGS. 5A and 5B illustrate a multi-nozzle system employing RF-based plugging detection in accordance with another example of the present description.
Figure 5B:
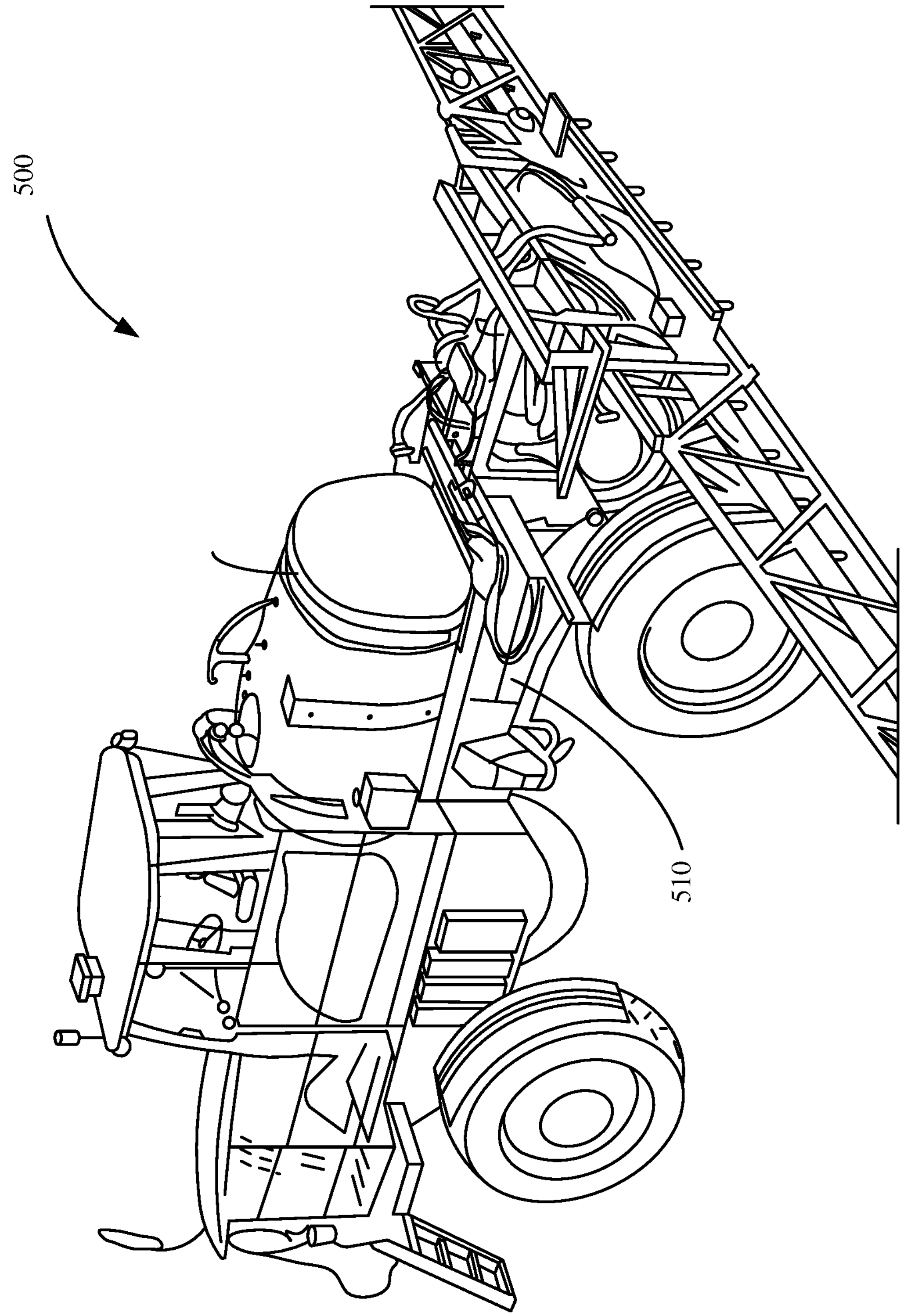

FIGS. 5A and 5B illustrate a multi-nozzle system employing RF-based plugging detection in accordance with another example of the present description. FIG. 5A is a bottom view of a multi-nozzle body having a plurality of individual RF transmitters, where each individual nozzle 610 of the multi-nozzle assembly has an associated RF transmitter 620. When only a subset set of nozzles 610 is active (for example, one pair of nozzles 610), only a subset of the associated transmitters 620 are also active. The RF signal transmitted by each RF transmitter 620 is attenuated by surrounding spray nozzles 610.

In examples where multiple RF transmitters 620 are used, any suitable technique for disambiguating the signals can be employed. For example, one RF transmitter 620 may operate in a first frequency range, while another RF transmitter 620 may operate in a second frequency range that does not overlap the first frequency range. Additionally, or alternatively, the different RF transmitters 620 may provide different modulation of their respective RF signals. Further still, the different RF transmitters 620 may be operated in sequence such that only a single RF transmitter 620 is operating at any given time.

FIG. 5B illustrates an agricultural sprayer 500 with RF receiver 510 mounted proximate a solution tank and configured to detect signals from the various RF transmitters 620 (shown in FIG. 5A). In one example, a controller coupled to RF receiver 510 is configured to compare data from each nozzle with default data stored in the controller, or in another suitable location, that indicates normal nozzle operation. Based on the comparison to the default data, the controller can determine if a particular nozzle or pair of nozzles has partial or full plugging.

Figure 6:
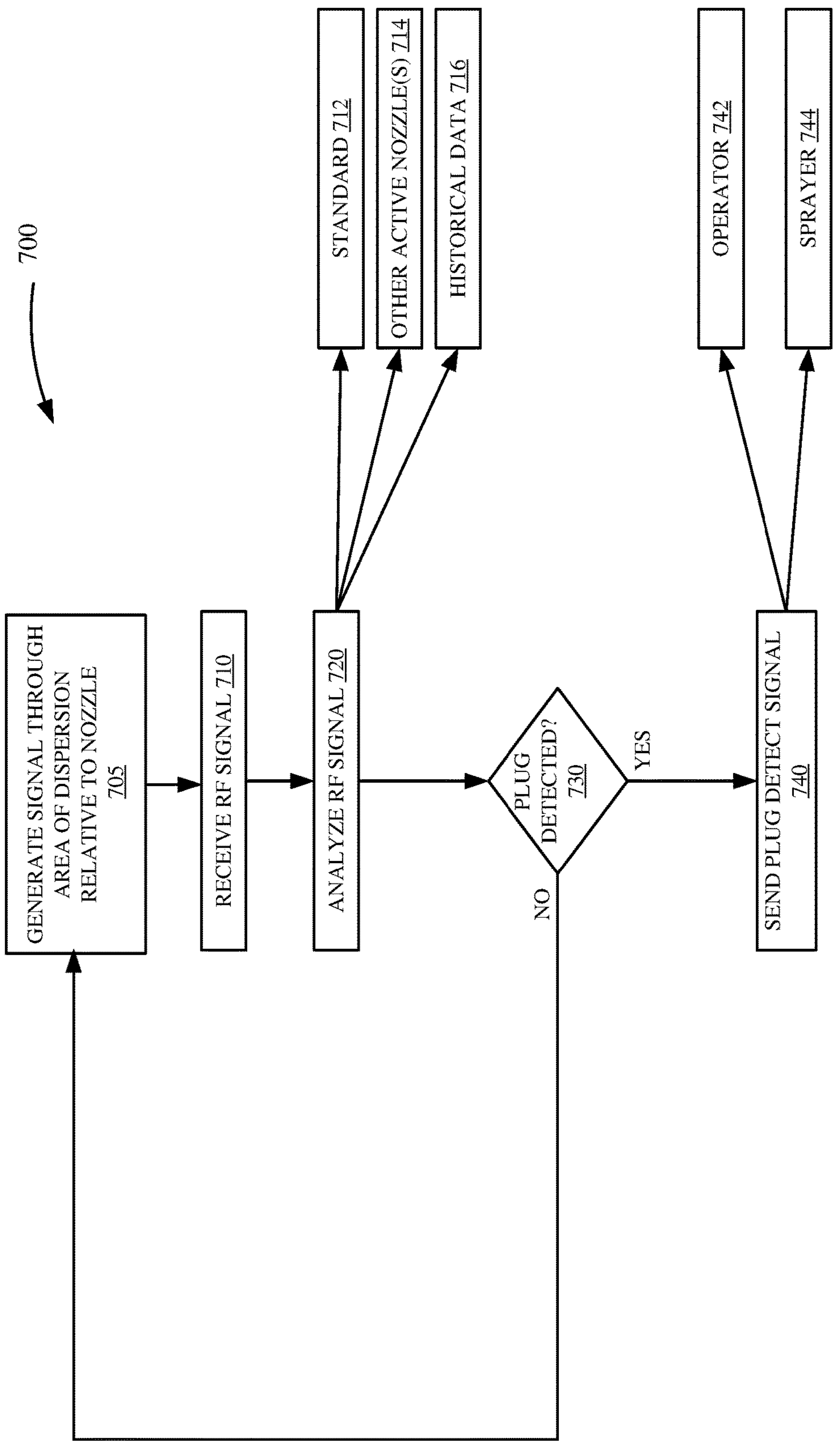
FIG. 6 is a flow diagram of a method of detecting a plugged nozzle using RF transmissions in accordance with an example of the present description.

FIG. 6 illustrates a flow diagram of a method of detecting a plugged spray nozzle in accordance with an example of the present description. Method 700 can be used to detect a partial or fully plugged status of a nozzle on an agricultural sprayer. Method 700 can also be used with at least some of the single and multi-nozzle systems described herein, or others.

Method 700 begins at block 705 where an RF signal is generated by a transmitter and passes through a dispersal area of at least one nozzle.

At block 710, the RF signal is received using an RF receiver, such as receiver 510. Next, at block 720, the received RF signal is analyzed. Analyzing the received RF signal, can include comparing the signal with a standard signal obtained and stored during known-good spraying conditions, as indicated in block 712. The standard can include a manufacturer-provided range of acceptable RF signals, or an indication of RF signals that indicate partial or complete plugging. Analyzing the received RF signal can additionally or alternatively include comparing the received signal with one or more received signals relative to other nozzles, as indicated in block 714. For example, using an average of a set of received RF signals can indicate that one or more nozzles in a set of nozzles is plugged, for example because the RF signal received from the plugged nozzle is different from the average in a statistically significant way. Historical data for a nozzle can also be used to detect full or partial plugging, as indicated in block 716. For example, a received RF signal will change as plugging is experienced, and the RF signal travels through a thinner, or non-existent spray.

At block 730, if a partial or fully plugged sensor is detected, method 700 proceeds to block 740 where an indication of plugging is provided. However, in the event that no plugging is detected for a particular nozzle, method 700 returns to block 705, and thus repeats.

At block 740, an indication of a plugged nozzle status is generated and sent. For example, an indication can be sent directly to an operator, as indicated in block 742, for example as an audible or visual alert. Additionally, or alternatively, a notification can be provided to an operator's device, such as a mobile phone. The indication can also be sent directly to the agricultural sprayer, as indicated in block 744, for remedial action, such as automatically switching to a different pair of active nozzles in a multi-nozzle assembly, increasing or pulsing the fluid pressure in an attempt to clear the plug, etc.

Figure 7:
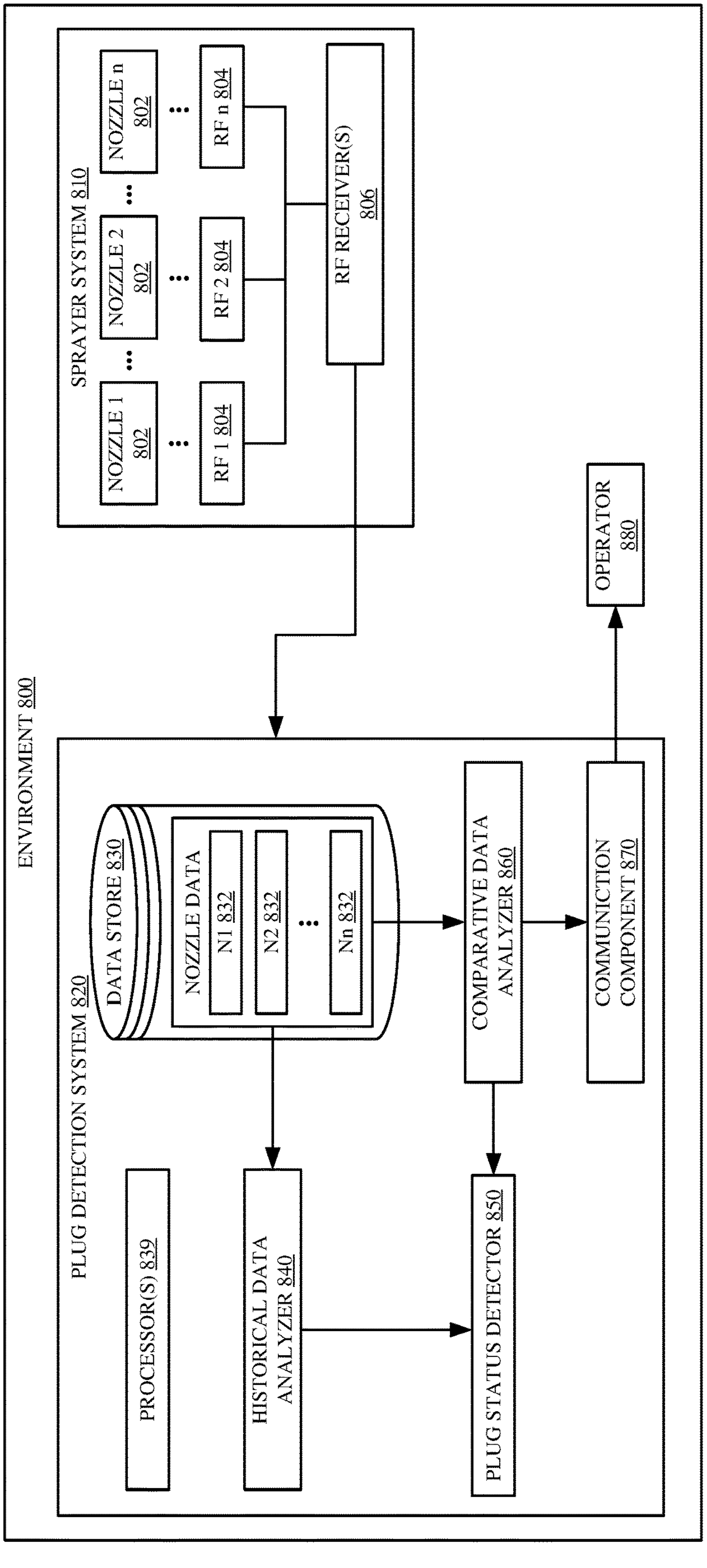
FIG. 7 illustrates an environment in which examples described herein are particularly useful.

FIG. 7 illustrates an environment in which examples of the present description can be used. Sprayer system 810 is located within environment 800, and may be mounted to an agricultural vehicle, or towed by an agricultural vehicle, as illustrated in FIG. 1. Sprayer system 810 has one or more nozzles 802, either mounted directly to a boom, or to a nozzle body. Each nozzle 802 is associated with an RF transmitter 804. The signals generated by RF transmitter(s) 804 are configured to pass through respective dispersal areas of respective nozzles 802 and be attenuated or otherwise distorted by droplets of liquid in the dispersal area. The distorted RF signal is then detected by an RF receiver 806. Sprayer system 810 may include a single RF receiver 806 (such as described above with respect to FIGS. 5A and 5B) configured to receive signals alternatively from different RF transmitters 804 or sprayer system 810 may employ two or more RF receivers 806 (such as described above with respect to FIGS. 4A and 4B).

Environment 800 also includes processor 839, an RF-based plug detection system 820, which may be located locally, for example as part of a computing unit within an agricultural vehicle, or remotely from an agricultural vehicle, for example within a separate computing system. RF-based plug detection system 820 includes storage component 830, which stores nozzle data 832, obtained from a plurality of nozzles 802, for example. Nozzle data 832 can be analyzed to detect a partial or completely plugged status within a nozzle 802. For example, historical data analyzer 840 can compare contemporaneously received nozzle data for a nozzle 802 to historical nozzle data 832 and detect a statistically significant difference. Additionally, comparative data analyzer 860 can compare nozzle data 832 from a single nozzle, to a known-good standard. For example, the known-good standard can include an average of contemporaneously received data 832 from all nozzles 802. Additionally, the known-good standard can include a standard provided from a manufacturer.

Based on a comparison, for example from historical data analyzer 840 or comparative data analyzer 860, plug status detector 850 detects that a nozzle 802 is experiencing partial or complete plugging, and generates a plugging indication. The plugging indication is then transmitted by communication component 870 to an operator 880, for example through a display on the agricultural vehicle, or through a display on a device associated with operator 880.

While examples described thus far generally use electromagnetic radiation in the form of radio-frequency transmissions to diagnose or otherwise detect conditions related to spray nozzle plugging, either partial or full, other forms of electromagnetic radiation can also be used in accordance with examples described herein. For instance, electromagnetic radiation in the form of thermal imaging can be used in addition to or instead of the radio-frequency transmission techniques. More specifically, examples may employ a thermal imaging camera for detection of nozzle blockage and/or spray characterization. When the sprayed liquid chemical comes in contact with plants, thermal changes occur to the plants. These thermal changes are captured by a thermal imaging camera that is installed either on the spraying device, or other suitable device, and analyzed to determine whether any nozzle of the agricultural is partially or fully blocked. This analysis generally employs using a heat signature to determine the spraying pattern. During nominal application, substantially all sprayed crops will have the same thermal characteristics. If, however, one or more of the spray nozzles begin to function poorly or not at all, then the crop immediately below and behind the malfunctioning nozzle(s) will not undergo the thermal changes induced by receiving a liquid spray and such condition is detectable using thermal imaging. In one example, the thermal change is due to evaporative cooling of a liquid chemical being applied to a dry crop or surface. Thus, as the liquid evaporates, the temperature of the sprayed crop or surface is reduced relative to the surrounding environment. This is just one example of a thermodynamic or chemical effect that causes the sprayed crop or surface to change temperature relative to the ambient background. It is also contemplated that other conditions could also result in thermal changes of the sprayed crops or surface. For example, a chemical reaction between the applied chemical and the crop could be exothermic or endothermic. Further, the applied chemical could be heated or cooled such that it is applied at a temperature that is different than the ambient environment.

Figure 8:
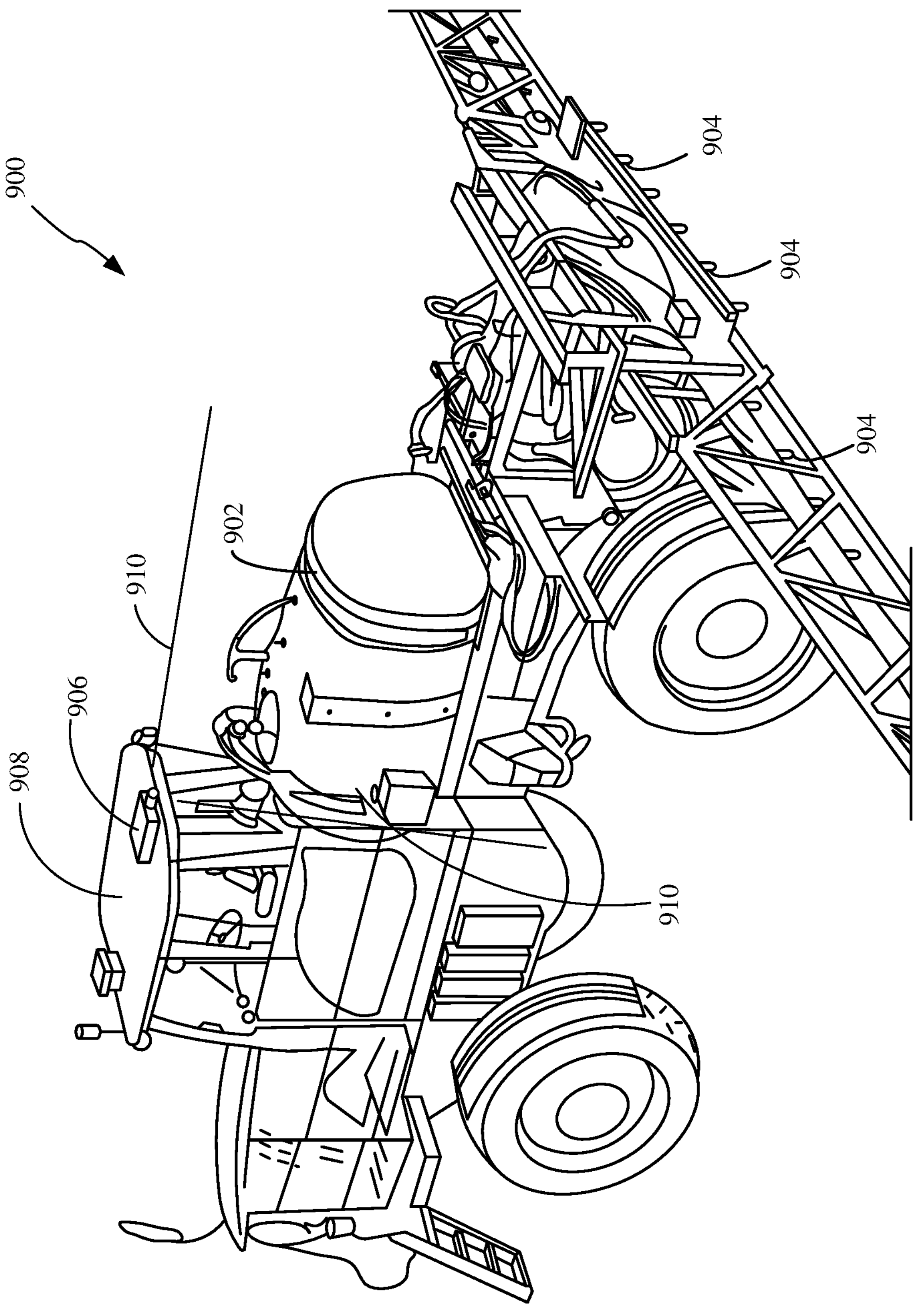
FIG. 8 is a diagrammatic view of an agricultural sprayer employing thermal imaging-based sprayer detection in accordance with an example of the present description.

FIG. 8 is a diagrammatic view of an agricultural sprayer employing thermal imaging-based sprayer detection in accordance with an example of the present description. Sprayer 900 includes a tank 902 containing a liquid chemical to be applied via one or more nozzles 904 to a crop. Additionally, agricultural sprayer 900 also includes a thermal imaging camera 906 disposed on roof 908 and arranged to have a field of view 910 that substantially encompasses the sprayed width behind agricultural sprayer 900. Thermal imaging camera 906 can be any suitable device that provides imaging in the form of either discrete images, or video, based on infrared heat detection. Typically, such cameras view the electromagnetic spectrum of approximately 9,000-14,000 nanometers and produce images of radiation in that wavelength spectrum. Thermal imaging camera 906 may be coupled to an analysis device, such as a controller of agricultural sprayer 900, or a plug detection system such as plug detection system 820 (shown in FIG. 7) in order to analyze one or more thermal images to characterize sprayer or nozzle performance. The actual connection between thermal imaging camera 906 and the analysis device can be via a wired connection, a wireless connection, such as WIFI, or any other suitable technique. Additionally, or alternately, the thermal image may simply be provided to the operator of agricultural sprayer 900 to provide an indication of sprayer efficacy.

Figure 9:
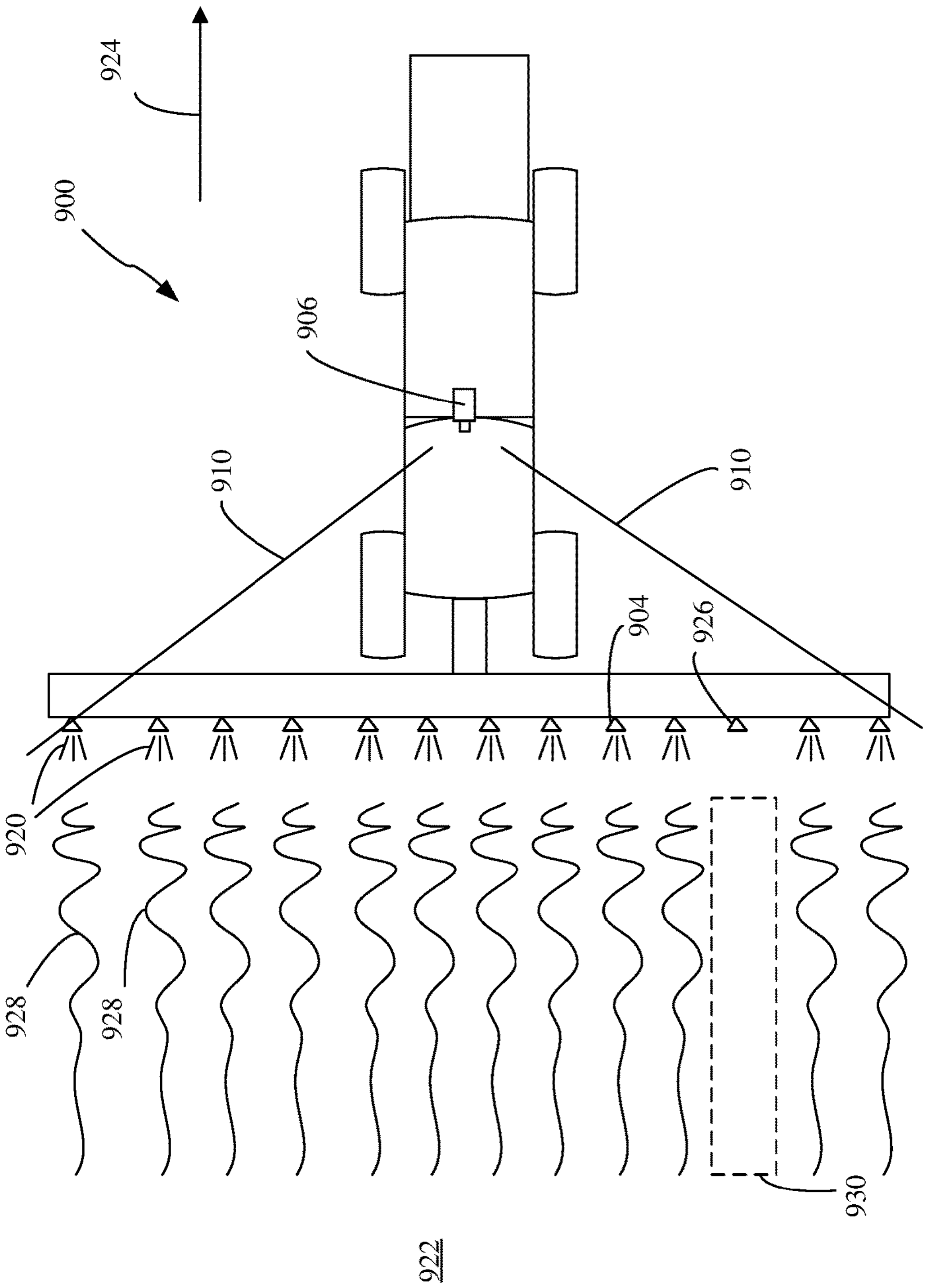
FIG. 9 is a top plan view of agricultural sprayer with a thermal imager applying liquid spray via sprayers to a field or agricultural surface in accordance with an example of the present description.

FIG. 9 is a top plan view of agricultural sprayer 900 applying liquid spray 920 via sprayers 904 to a field or agricultural surface 922. Agricultural sprayer 900 is moving in the direction indicated by arrow 924 and all sprayer nozzles 904, with the exception of nozzle 926, are spraying essentially nominally. As the liquid chemical is applied to agricultural surface 922, a detectable thermal change begins immediately and then stabilizes as the liquid dries onto the agricultural surface. The diagrammatic representation of the thermal change is indicated at reference numerals 928. As can be seen, in the portion of agricultural surface 922 that is immediately behind malfunctioning sprayer nozzle 926, no thermal change is occurring. Thermal imaging system 906 sees this region 930 within field of view 910 and can provide an automatic indication of the malfunction of nozzle 926 to the operator of agricultural sprayer 900. Further, a video output of the image provided by thermal imaging system 906 may also provide an intuitive output to the operator who may see that the applied thermal field is not even and that something is wrong or at least requiring additional attention or diagnosis. The identification of a malfunctioning nozzle can be used both in terms of identifying such occurrence quickly such that crop effects can be mitigated, but also to ensure that the situation is repaired or otherwise ameliorated as quickly as possible such that effective spraying can resume quickly.

While the example described with respect to FIGS. 8 and 9 provide a thermal imaging system mounted to an agricultural sprayer and configured to observe or otherwise detect the application of a sprayed liquid chemical to an agricultural crop or field, examples can be employed where the thermal imaging system is not directly attached to the agricultural sprayer.

Figure 10:
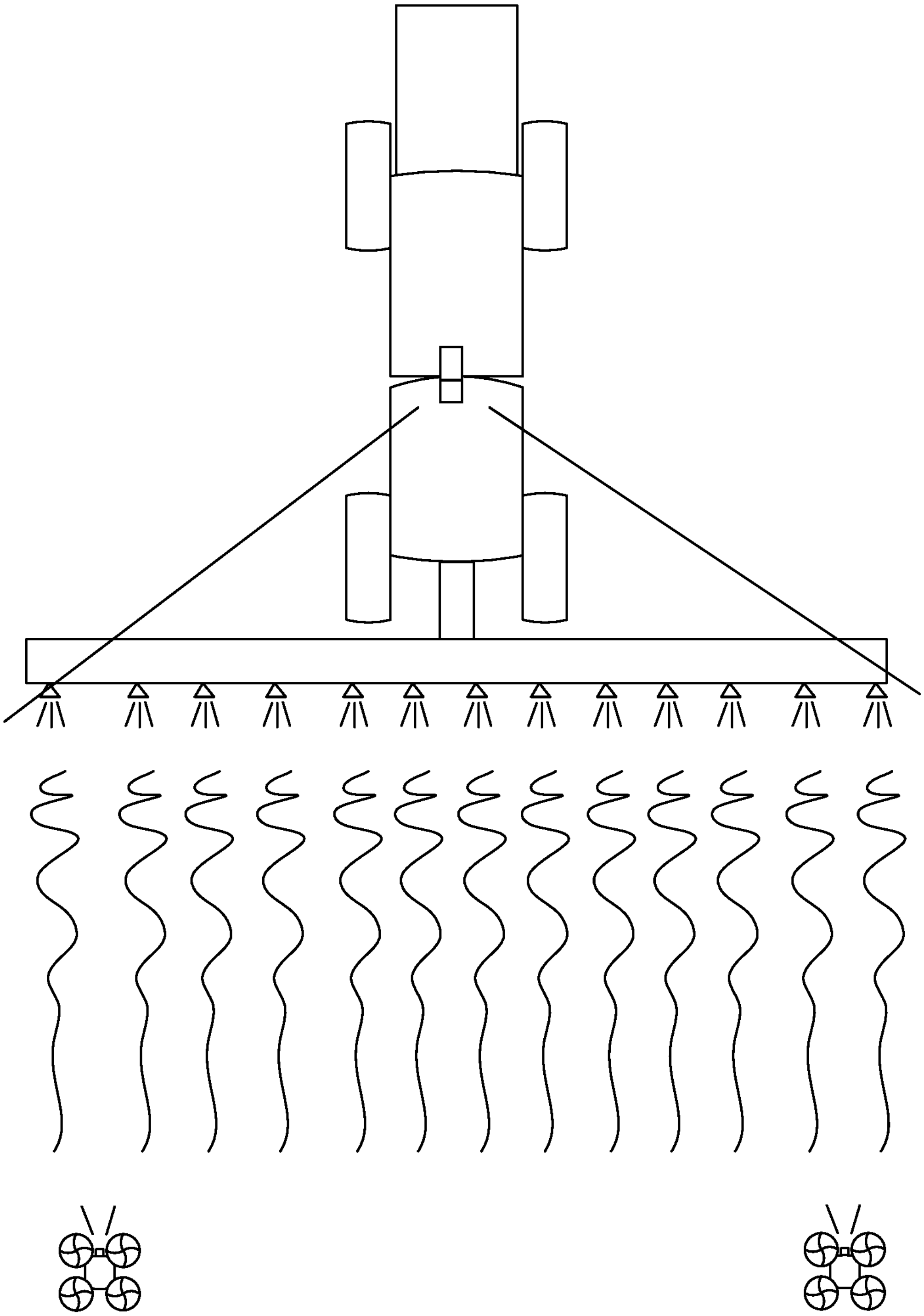
FIG. 10 is a diagrammatic view of an agricultural sprayer applying a liquid chemical to an agricultural surface using a number of spray nozzles and a thermal imager in accordance with an example of the present description.

FIG. 10 is a diagrammatic view of an agricultural sprayer applying a liquid chemical to an agricultural surface using a number of spray nozzles. However, one or more unmanned aerial vehicles (drones) are programmed to follow the agricultural sprayer and include a thermal imaging system that is directed to the agricultural field immediately behind the sprayers relative to the direction of travel 924. Thus, the thermal imaging system(s) on the drone(s) actually detects the thermal images. The drone image data can be transmitted to a suitable analytical device, such as plug detection system 820, or provided to a display for the operator of agricultural sprayer 900.

Using thermal imaging of the application of a liquid chemical to an agricultural surface or crop may also provide the identification of problems even as they are beginning and may aid in the preventative maintenance of spray nozzles.

Figure 11:
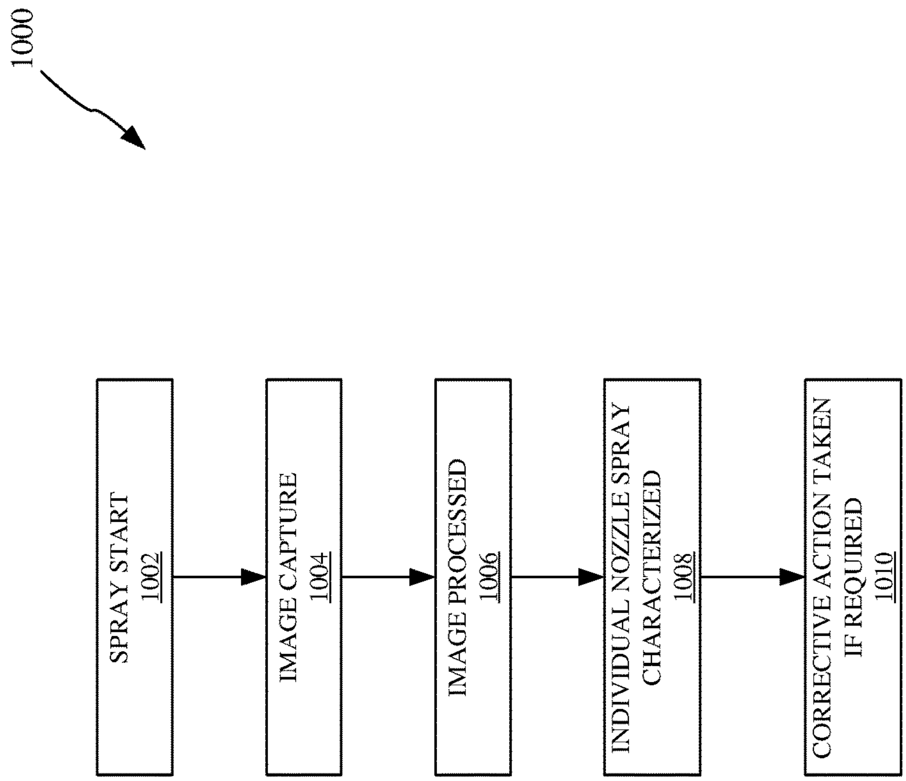
FIG. 11 is a flow diagram of a method of assessing spray nozzle operation of an agricultural sprayer in accordance with an example of the present description.

FIG. 11 is a flow diagram of a method of assessing spray nozzle operation of an agricultural sprayer in accordance with an example of the present description. Method 1000 begins at block 1002 marked spray start. At block 1002, the agricultural sprayer begins applying a liquid chemical to a crop or agricultural field. Next, at block 1004, a thermal image of the crop or field with the liquid chemical just applied is acquired. At block 1006, the acquired or captured thermal image is processed by an image processor to identify a heat signature and determine the spray pattern. Next, at block 1008, individual nozzle spray is characterized by the image processor. Such characterization can include providing an indication (such as a percentage) regarding a degree to which the nozzle is plugged. Finally, at block 1010, if the analysis of the thermal image indicates that corrective action is to be taken (for example, if the plugging percentage is above a selected threshold), such action is taken. This may include replacing or repairing a plugged nozzle, or performing any suitable nozzle operations, such as purging or cleaning, in order to restore nozzle operation.

The image processing can be performed by a user, any suitable algorithm or artificial intelligence routine, or other suitable techniques. An output can be provided to the user that characterizes the blockage for each nozzle as a percentage of total blockage, and may provide an indication of whether a nozzle should be cleaned versus replaced.

Figure 12:
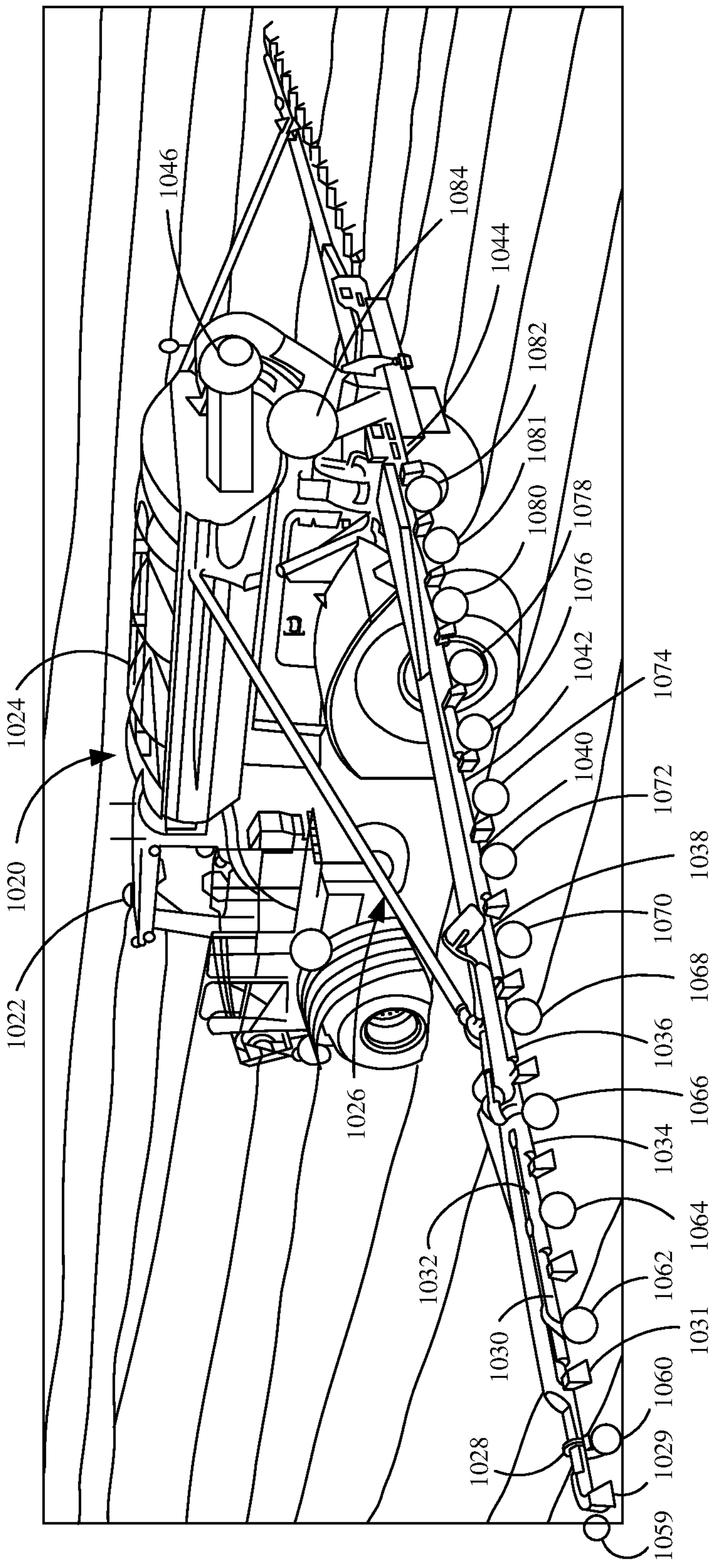
FIG. 12 is a pictorial illustration of an agricultural spreader that spreads dry material on an agricultural field.

FIG. 12 is a pictorial illustration of another example in which aspects of the present description can be used. FIG. 12 shows a spreader 1020 which spreads dry matter (which maybe particulate or granular matter, such as fertilizer) on an agricultural field. FIG. 12 shows that spreader 1020 has an operator compartment 1022 and a bin 1024. Bin 1024 holds the dry material which may be top loaded, or otherwise loaded, into bin 1024. A conveyor (not shown) is located beneath bin 1024 and carries the dry material, as it drops from bin 1024 onto the conveyor, toward the rear of spreader 1020.

An air boom 1026 includes a plurality of delivery pipes (or conduits), some of which are labeled 1028-1042. The delivery pipes extend from a generally central region of boom 1026 and terminate at different distances from the central region of boom 1026 along the longitudinal axis of boom 1026. Therefore, some of the pipes terminate closely adjacent the center portion of boom 1026, such as pipe 1044. Other pipes terminate out further toward the distal end of boom 1026, such as pipe 1028. While FIG. 12 shows an arrangement for boom 1026 on the driver's side of spreader 1020, boom 1026 may have a similar arrangement on the opposite side of spreader 1020 as well.

A fan 1046 generates air pressure in the delivery pipes of boom 1026. The air pressure moves air from the central region of boom 1026 toward the distal end and out the exit end of each of the pipes that form 1026.

Thus, the dry material is moved from bin 1024 by the conveyor, into each of the delivery pipes, through a manifold that is connected to the inlet openings of each pipe. The dry material is then carried from where it enters the pipes to the outlet end of each of the pipes by the air introduced into those pipes by fan 1046. Each of the pipes has a corresponding deflector (mounted proximate the outlet ends of the pipes) which deflects the material (after it exits the outlet end of the corresponding delivery pipe) downwardly onto the agricultural field over which spreader 1020 is traveling. Thus, as shown in FIG. 12, delivery pipe 1028 has a corresponding deflector 1029. Delivery pipe 1030 has a corresponding deflector 1032, etc. As the particulate material exits through the outlet end of the corresponding delivery pipe, its corresponding deflector deflects the material downward, through a dispersal area, onto the field.

Figure 13:
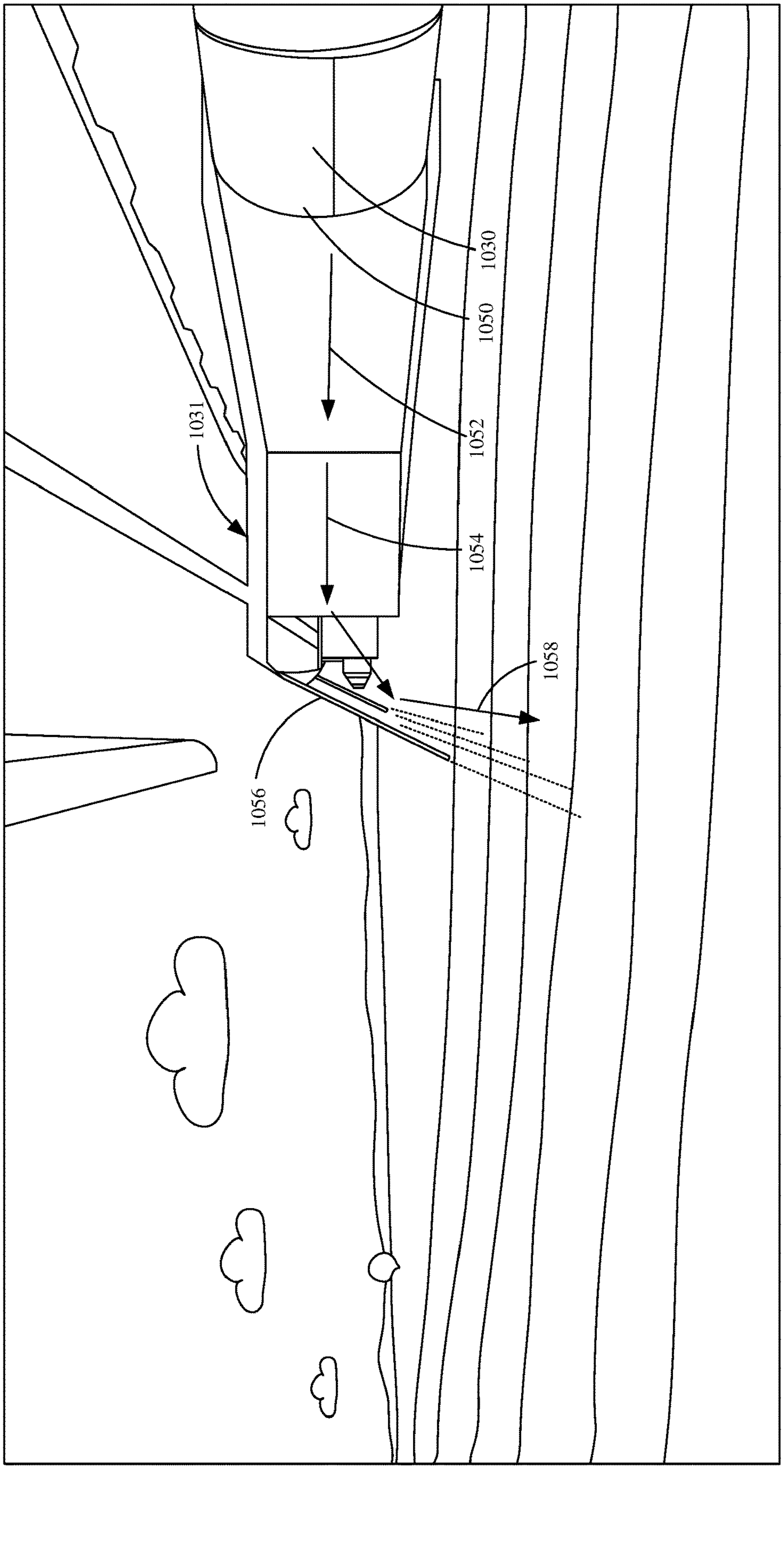
FIG. 13 is an enlarged view of an exit end of a delivery pipe and a deflector on the agricultural spreader shown in FIG. 12.

FIG. 13 is a more detailed illustration of a deflector. FIG. 13 shows one of the delivery pipes (e.g., delivery pipe 1032) that has an outlet end 1050. Material travels out of the outlet end 1050 generally in the direction indicated by arrow 1052, as it is carried by the air being forced through pipe 1032 by fan 1046. Deflector 1031 deflects the air flow (and hence the material carried by the air flow) so that it is directed rearwardly, as indicated by arrow 1054. The rearwardly directed material then interacts with a downward extending portion 1056 of deflector 1031 so that the material is then deflected downwardly, as indicated by arrow 1058, onto the field over which spreader 1020 is traveling. This same arrangement is illustratively provided proximate the exit ends of each of the delivery pipes on both sides of boom 1026.

In one example, the dry material is particulate or granular, or power-like. In such an example, the material flows easily under the influence of the air traveling through the delivery pipes, from an entry manifold (at the inlet end of each pipe) to the exit end of the delivery pipes. The corresponding deflectors then deflect the material downwardly onto the field. Each deflector thus causes the material to be deflected downwardly, passing through a dispersal area, which is similar to the various dispersal areas 220 shown in FIG. 2A, and onto the agricultural field.

However, for various different reasons, the dry material can clump or acquire other characteristics that make it difficult to distribute through spreader 1020 (such as through the conveyor, through the manifold into the delivery pipes, and out the exit end of the delivery pipes, onto the field, by interacting with the deflector). For instance, if moisture is introduced into the bin 1024, or into the system at another place, this can cause the dry material to clump or otherwise acquire a characteristic (such as stickiness or adhesiveness) which makes it difficult to spread using an air spreader. Under such conditions, the material can become plugged anywhere in spreader 1020. For instance, it can become partially or fully plugged on the conveyor, in the manifold leading from the conveyor to the delivery pipes, inside the delivery pipes, at the exit end of the delivery pipes, or even on the corresponding deflectors. As with the examples already described, it can be difficult for an operator to detect this.

Radio frequency signals are attenuated, or take on another measurable or detectable characteristic, as they pass through a cloud of particulate or dry material, such as the dispersal area of dry material created at the outlet end of the delivery pipes and deflectors of spreader 1020. Thus, in one example, boom 1026 has a plurality of radio frequency components mounted closely proximate each of the deflectors on boom 1026. Some of the radio frequency components are labeled 1059-1082. As described above with respect to the sprayer example, these components can emit a radio frequency signal. A radio frequency receiver 1084, which can be mounted to a central portion of spreader 1020, can detect or read those signals after they pass through the corresponding dispersal areas. In this way, the attenuation (or other characteristic) of each of the RF signals, emitted by each of the RF transmitters, can be analyzed to determine whether the attenuation is the same as that which is expected for an RF signal passing through a dispersal area of the dry material being applied. Thus, a plug condition (e.g., partial or total blockage of the individual delivery pipes or deflectors) can be identified.

It should also be noted, with respect to FIG. 12, that the position of the RF transmitter and RF receiver can be reversed. By way of example, it may be that RF receiver 1084 is, instead, an RF transmitter which transmits an RF signal having known characteristics (such as known frequency, amplitude, etc.). Then, each of the RF components 1059-1082 can illustratively be RF receivers. They are positioned on the opposite side of the dispersal area corresponding to the deflectors that they are mounted next to, and can thus detect signal attenuation that results from the RF signals transmitted by the centrally located RF transmitter, through the corresponding dispersal area. In this way, the RF receivers will sense a more heavily attenuated signal, if the transmitted RF signal passes through a dispersal area where the dry material is actually being dispersed. However, if it passes through a dispersal area for a plugged or partially plugged delivery pipe or deflector, then the signal will not be as heavily attenuated.

Figure 14:
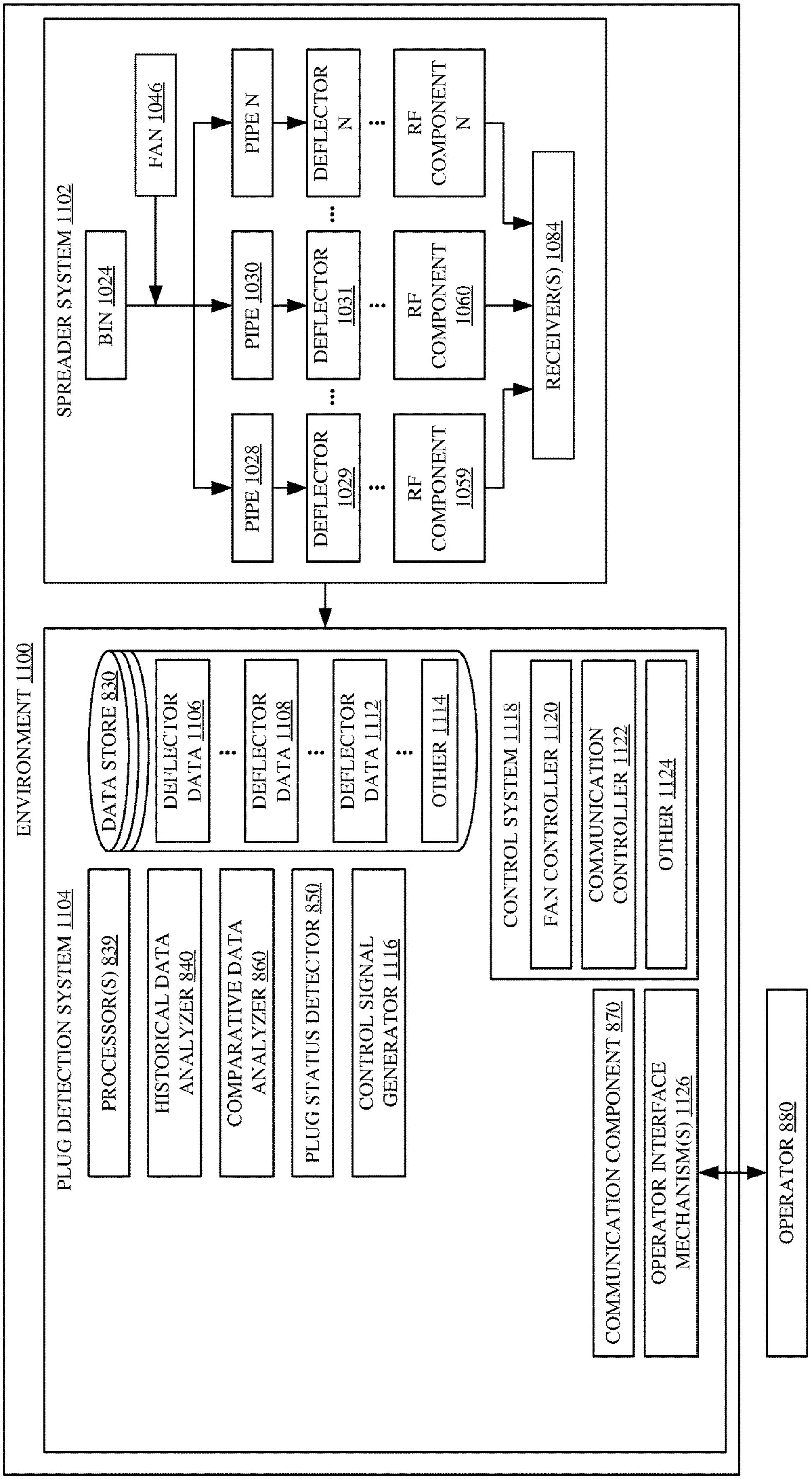
FIG. 14 is a block diagram of one example of an agricultural spreader.

FIG. 14 is a block diagram of an environment 1100 which shows a spreader system 1102 which includes some of the items on spreader 1020. It also includes a plug detection system 1104 which can be disposed on spreader 1020 or elsewhere. Spreader system 1102 shows some items described above. However, it illustratively includes pipe N, its corresponding deflector N and RF component N. This notation illustrates that an RF component can be positioned on boom 1026 so that it transmits an RF signal through the dispersal area corresponding to each deflector on boom 1026, and each delivery pipe.

In the example shown in FIG. 14, plug detection system 1104 is similar to plug detection system 820 shown in FIG. 7, and similar items are similarly numbered. However, instead of data store 830 including nozzle data, it illustratively includes deflector data 1106-1112. This data characterizes the RF signal attenuation that occurs with respect to an RF signal traveling through a dispersal area generated by the various deflectors 1029-N shown in spreader system 1102. Thus, it illustratively represents what would be expected attenuation if spreader system 1102 is operating properly.

In one example, the deflector data 1106-1112 can be historical data which is captured during proper operation of spreader system 1102. In another example, it can be comparative data so that, for instance, when the RF attenuation (or other characteristic) is identified for a particular delivery pipe and deflector, it can be compared to the same information for the corresponding delivery pipe and deflector on the opposite side of boom 1026. In such an example, the two delivery pipes will have the same length, and therefore they will have similar resistance to air flow and other characteristics. Thus, the signal attenuation resulting from the RF signal passing through the corresponding dispersal areas can be expected to be similar.

In another example, data store 830 can include both comparative data, and historical data so that a measured RF signal characteristic can be compared to both references. In yet another example, the data in data store 830 represents modeled data indicating the expected RF signal characteristics, even though it does not represent actual comparative data or historical data. All of these and other types of data are contemplated herein. Data store 830 can include a wide variety of other information 1114, as well.

FIG. 14 also shows that plug detection system 1104 can have a control signal generator 1116 which can generate control signals to control various items in controllable subsystems 1118. The controllable subsystems 1118 can include such things as fan controller 1120, communication controller 1122 and a wide variety of other items 1124. Fan controller 1120 can illustratively control fan 1046. For instance, when plug status detector 850 detects a plug, fan controller 1120 can increase the fan speed to increase the pressure in boom 1026 in an attempt to eliminate the plug. Similarly, fan controller 1120 can vary the fan speed to pulse the pressure within boom 1026, again in an attempt to eliminate the plug.

Communication controller 1122 can control communication component 870 to generate communication indicative of the fact that a plug exists and send that to various systems. For instance, it can control operator interface mechanisms 1126 to generate an alert. Operator interface mechanisms 1126 can include such things as a display mechanism, an audio mechanism, or a haptic feedback mechanism, all of which can be used to generate an alert for operator 880. In another example, the operator interface mechanisms 1126 can include handheld or other mobile devices that are carried by operator 880 in operator compartment 1022. In yet other examples, communication component 870 can be controlled to communicate with a remote computing system, such as a farm manager's computing system, the computing system of maintenance personnel, etc.

Figure 15:
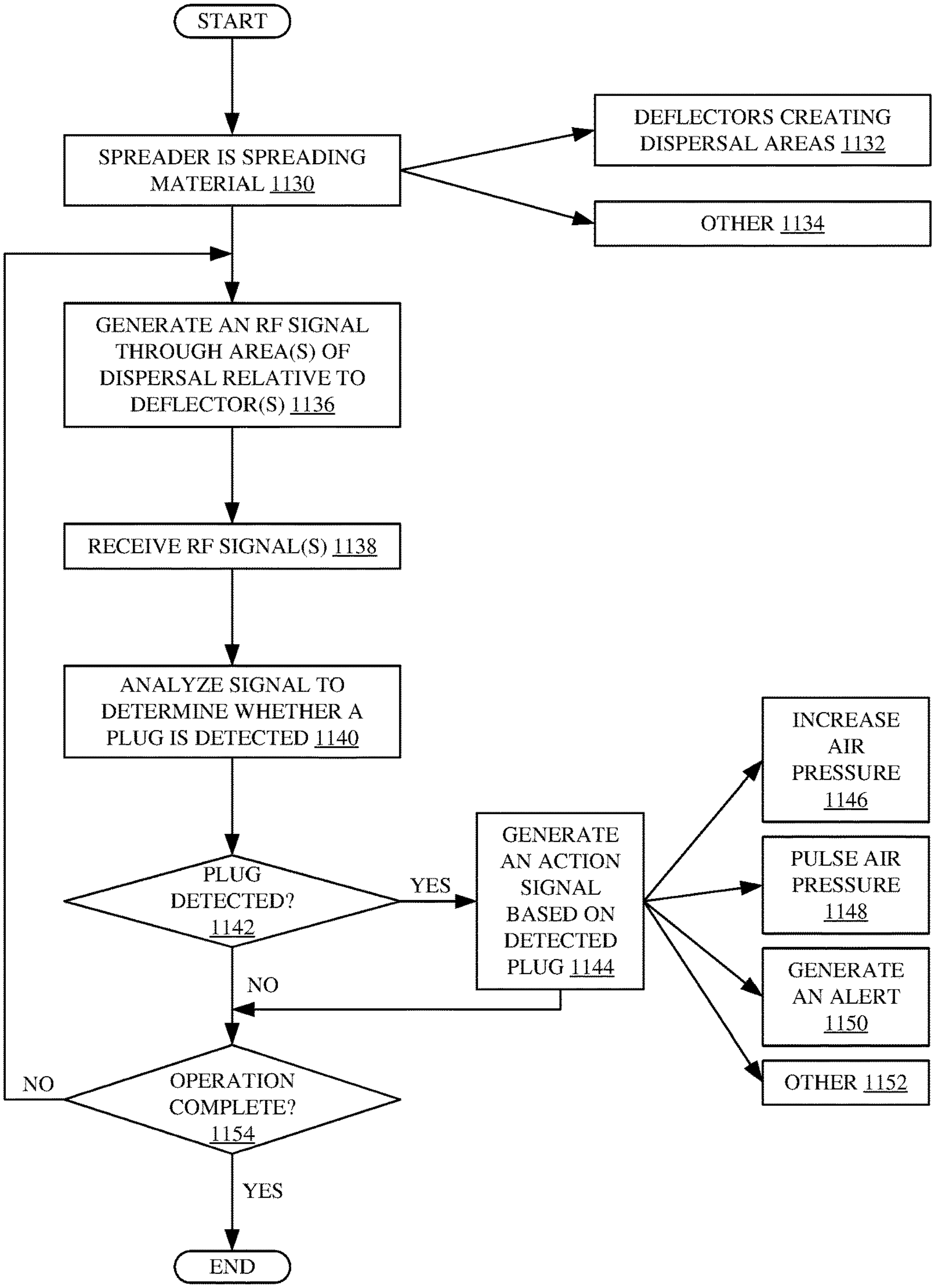
FIG. 15 is a flow diagram showing one example of the operation of an agricultural spreader.

FIG. 15 is a flow diagram illustrating one example of the operation of environment 1110 in detecting plug conditions in the spreader system 1102 of spreader 1020. It is first assumed that spreader 1020 has begun a spreading operation and is spreading the material from bin 1024. This is indicated by block 1130 in the flow diagram of FIG. 15. In the example being discussed, the deflectors are creating dispersal areas where the dry material is being dispersed onto the field. This is indicated by block 1132. Spreader 1020 can be spreading material in other ways as well, and this is indicated by block 1134.

At some point, an RF transmitter transmits an RF signal through the areas of dispersal relative to each of the deflectors on spreader 1020. This is indicated by block 1136. In the example being discussed, it is assumed that the RF components located on boom 1026 (e.g., RF components 1059-1082) are the RF transmitters, and that they each transmit an RF signal that will pass through the dispersal area corresponding to the deflector proximate which they are mounted, before arriving at RF receiver 1084. However, as discussed above, each of the RF components on boom 1026 can be an RF receiver where component 1084 is an RF transmitter. For the purposes of the present discussion, though, it is assumed that the RF components on the boom 1026 are transmitters and the component 1084 is a receiver.

RF receiver 1084 then receives the RF signals from the various transmitters. This is indicated by block 1138. In one example, it can distinguish between the RF signals transmitted by the different transmitters based upon the transmission frequency. In another example, they can be temporally distinguished in that each of the RF transmitters may transmit at a different time. In another example, they may be distinguished based on the phase with which they are transmitting the RF signal. In yet another example, each of the RF transmitters may be independently addressable by the receiver so that they can be actuated to transmit, under the control of the RF receiver 1084. All of these and other scenarios are contemplated herein.

Plug detection system 1104 then analyzes the RF signals to determine whether a plug condition is detected. This is indicated by block 1140. For instance, historical data analyzer 840 can analyze the received RF signal for a particular transmitter against historical data to see whether the received RF signal has expected characteristics (such as an expected amplitude, attenuation, etc.). In another example, comparative data analyzer 860 can compare the RF signal received by the transmitter under analysis against the RF signals received by other RF transmitters on boom 1026 to determine whether it is similar, or varies in an expected way, from those other signals.

Based on the analysis, plug status detector 850 determines whether there is a plug conditions (e.g., full or partial plug) in the spreading system of spreader 1020. This is indicated by block 1142. If so, it provides an indication of this to control signal generator 1116 which generates an action signal based upon the detected plug. This is indicated by block 1144.

In one example, the action signal controls the fan controller 1120 to increase air pressure or pulse the air pressure in boom 1126 in response to detecting a plug. This can be done in an attempt to dislodge the plug. Increasing the air pressure is indicated by block 1146 and pulsing the air pressure is indicated by block 1148.

In another example, communication controller 1122 can control communication component 870 to generate an alert or another output message for operator 880. This is indicated by block 1150. The alert can be a visible, audio or haptic alert. It can be a display that shows the dispersal areas that are operating, and those that are not operating properly, or a wide variety of other things.

Controllable subsystem 1118 can be controlled in other ways, in response to the control signals generated by control signal generator 1116 as well. This is indicated by block 1152 in the flow diagram of FIG. 15. This type of operation continues until the spreading operation is complete. This is indicated by block 1154. Also, the figures show a number of blocks with functionality ascribed to each block. It will be noted that fewer blocks can be used so the functionality is performed by fewer components. Also, more blocks can be used with the functionality distributed among more components.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It should also be noted that the different examples described herein can be combined in different ways. That is, parts of one or more examples can be combined with parts of one or more other examples. All of this is contemplated herein.

Example 1 is an agricultural spreader, comprising:

a material holding bin that holds material to be spread onto an agricultural surface over which the agricultural spreader travels;

at least one delivery conduit having an inlet end receiving the material to be spread and an outlet end, through which the material to be spread exits and is directed to the agricultural surface through a corresponding first dispersal area;

a first radio-frequency (RF) transmitter disposed to generate an RF signal that passes through the first dispersal area, the RF signal bring detectably changed when interacting with the material traveling through the first dispersal area;

an RF receiver disposed to receive the RF signal after the RF signal passes through the first dispersal area, the RF receiver providing a first output indicative of the received RF signal; and a controller coupled to the RF receiver and configured to detect plugging of the at least one delivery conduit based on the first output of the RF receiver.

Example 2 is the agricultural spreader of any or all previous examples wherein the at least one delivery conduit comprises:

a plurality of delivery conduits, each having an inlet end receiving the material to be spread and an outlet end, through which the material to be spread exits and is directed to the agricultural surface through a corresponding dispersal area.

Example 3 is the agricultural spreader of any or all previous examples wherein the RF receiver is disposed to receive the RF signal transmitted by the first RF transmitter after passing through the first dispersal area corresponding to a first delivery conduit of the plurality of delivery conduits, and further comprising:

a second RF transmitter disposed to transmit an RF signal to the RF receiver through a second dispersal area corresponding to a second delivery conduit of the plurality of delivery conduits, the RF receiver generating a second output indicative of the received RF signal after passing through the second dispersal area.

Example 4 is the agricultural spreader of any or all previous examples wherein the controller is configured to detect plugging by comparing the first output of the first RF receiver to the second output of the RF receiver.

Example 5 is the agricultural spreader of any or all previous examples wherein the controller is configured to detect plugging by comparing the first output of the first RF receiver to predefined data indicative of an expected output.

Example 6 is the agricultural spreader of any or all previous examples wherein the material to be spread comprises dry, particulate material, and further comprising:

a fan that generates airflow through the first and second delivery conduits, the airflow carrying the particulate material through the first and second delivery conduits and out the outlet ends of the first and second delivery conduits, respectively.

Example 7 is the agricultural sprayer of any or all previous examples and further comprising:

a first deflector disposed proximate the outlet end of the first delivery conduit and having a deflecting surface positioned to deflect the particulate material to the agricultural surface through the first dispersal area.

Example 8 is the agricultural sprayer of any or all previous examples and further comprising:

a second deflector disposed proximate the outlet end of the second delivery conduit and having a deflecting surface positioned to deflect the particulate material to the agricultural surface through the second dispersal area.

Example 9 is the agricultural spreader of any or all previous examples wherein the controller is configured to detect plugging proximate the first deflector based on the output from the first output from the RF receiver and to detect plugging proximate the second deflector based on the second output from the RF receiver.

Example 10 is the agricultural spreader of any or all previous examples wherein the controller is configured to generate an action signal based on the detection, to control a controllable system based on the detection.

Example 11 is the agricultural spreader of any or all previous examples wherein the controller is configured to generate the action signal to control the airflow through the first and second delivery conduits based on the detection.

Example 12 is a method of controlling an agricultural spreader, comprising:

controlling a fan to generate airflow that carries particulate material through a delivery conduit from an inlet end that receives the particulate material to an outlet end, through which the particulate material exits the delivery conduit and is directed to an agricultural surface through a corresponding first dispersal area;

generating a radio frequency (RF) signal, with a first RF transmitter, that passes through the first dispersal area, the RF signal bring detectably changed when interacting with the particulate material traveling through the first dispersal area;

receiving the RF signal, with an RF receiver, after the RF signal passes through the first dispersal area;

providing a first output, from the RF receiver, indicative of the received RF signal; and detecting a plug condition in the delivery conduit based on the first output.

Example 13 is the method of any or all previous examples wherein controlling a fan comprises:

controlling the fan to generate airflow that carries particulate material through a plurality of delivery conduits from an inlet end corresponding to each delivery conduit, that receives the particulate material, to an outlet end corresponding to each delivery conduit, through which the particulate material exits the corresponding delivery conduit and is directed to an agricultural surface through a corresponding dispersal area.

Example 14 is the method of any or all previous examples wherein receiving the RF signal comprises receiving the RF signal transmitted by the first RF transmitter after passing through the first dispersal area corresponding to a first delivery conduit of the plurality of delivery conduits and wherein generating an RF signal comprises:

generating an RF signal with a second RF transmitter disposed to transmit the RF signal to the RF receiver through a second dispersal area corresponding to a second delivery conduit of the plurality of delivery conduits.

Example 15 is the method of any or all previous examples wherein receiving the RF signal comprises:

receiving the RF signal generated by the second RF transmitter after the RF signal passes through the second dispersal area, the RF receiver generating a second output indicative of the received RF signal after passing through the second dispersal area.

Example 16 is the method of any or all previous examples and further comprising:

generating an action signal to control a controllable system on the agricultural spreader based on the detected plug condition.

Example 17 is the method of any or all previous examples wherein generating an action signal comprises:

controlling the fan to vary the airflow through the first and second delivery conduits based on the detected plug condition.

Example 18 is an agricultural spreader, comprising:

a storage bin that stores a particulate material to be spread onto an agricultural surface;

a boom that has a plurality of delivery conduits, each with an inlet end proximate the storage bin and a corresponding outlet end;

a fan that generates airflow through the plurality of delivery conduits to carry particulate matter from the inlet end of each delivery conduit to the corresponding outlet end;

a plurality of deflectors, each deflector, of the plurality of deflectors, corresponding to a delivery conduit and being mounted proximate the outlet end of the corresponding delivery conduit to deflect particulate matter exiting the outlet end of the corresponding delivery conduit, through a dispersal area, corresponding to the deflector, onto the agricultural surface;

a first radio-frequency (RF) transmitter disposed to generate a first RF signal that passes through the dispersal area corresponding to a first deflector of the plurality of deflectors, wherein the first RF signal is detectably changed when interacting with the particulate material passing through the dispersal area corresponding to the first deflector;

a second RF transmitter disposed to generate a second RF signal that passes through the dispersal area corresponding to a second deflector of the plurality of deflectors, wherein the second RF signal is detectably changed when interacting with the particulate matter passing through the dispersal area corresponding to the second deflector;

an RF receiver disposed to receive the first and second RF signals and provide an output indicative thereof; and a controller coupled to the RF receiver and configured to detect a plug condition of at least one of the plurality of delivery conduits based on the output of the RF receiver.

Example 19 is the agricultural spreader of any or all previous examples and further comprising a controllable system, wherein the controller is configured to generate and action signal to control the controllable system on the agricultural spreader based on the detected plug condition.

Example 20 is the agricultural spreader of any or all previous examples wherein the controllable system comprises an operator interface mechanism and wherein the controller is configured to generate the action signal to control the operator interface mechanism to generate an alert indicative of the plug condition.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural spreader, comprising:

a material holding bin that holds solid material to be spread onto an agricultural surface over which the agricultural spreader travels;

a plurality of delivery conduits, each delivery conduit having an inlet end receiving the solid material to be spread and an outlet end, through which the solid material to be spread exits and is directed to the agricultural surface through a corresponding dispersal area;

a first radio-frequency (RF) transmitter disposed to generate a first RF signal that passes through a first dispersal area of a first delivery conduit of the plurality of delivery conduits, the first RF signal being detectably changed when interacting with the solid material traveling through the first dispersal area;

a second RF transmitter disposed to generate a second RF signal that passes through a second dispersal area of a second delivery conduit of the plurality of delivery conduits, the second RF signal being detectably changed when interacting with the solid material traveling through the first dispersal area;

an RF receiver configured to receive the first RF signal after the first RF signal passes through the first dispersal area and the second RF signal after the second RF signal passes through the second dispersal area, the RF receiver configured to provide one or more outputs based on one or more of the first RF signal and the second RF signal; and a controller coupled to the RF receiver and configured to detect plugging of at least one of the first delivery conduit or the second delivery conduit based on the one or more outputs of the RF receiver.

2. The agricultural spreader of claim 1, wherein the RF receiver is disposed at a location on the agricultural spreader relative to the first RF transmitter and relative to the second RF transmitter where at least a portion of the first dispersal area is physically located between the RF receiver and the first RF transmitter and where at least a portion of the second dispersal area is physically located between the RF receiver and the second RF transmitter.

3. The agricultural spreader of claim 2 and further comprising:

a plurality of RF transmitters, each one of the plurality of RF transmitters corresponding to a respective one of the plurality of delivery conduits, each RF transmitter disposed to generate a respective RF signal through the dispersal area of its corresponding delivery conduit, each respective RF signal being detectably changed when interacting with the solid material traveling through the dispersal area of the corresponding delivery conduit; and wherein the RF receiver is configured to receive each respective RF signal after each respective RF signal passes through the dispersal area of the corresponding delivery conduit and where at least a portion of each respective dispersal area of each delivery conduit is physically located between the RF receiver and the corresponding RF transmitter.

4. The agricultural spreader of claim 1, wherein the RF receiver is configured to provide a first output indicative of the received first RF signal and a second output indicative of the received second RF signal and wherein the controller is configured to detect plugging by comparing the first output of the RF receiver to the second output of the RF receiver.

5. The agricultural spreader of claim 1, wherein the controller is configured to detect plugging by comparing the one or more outputs of the RF receiver to predefined data indicative of an expected output.

6. The agricultural spreader of claim 1, wherein the solid material to be spread comprises particulate material, and further comprising:

a fan that generates airflow through the first and second delivery conduits, the airflow carrying the particulate material through the first and second delivery conduits and out the outlet ends of the first and second delivery conduits, respectively.

7. The agricultural spreader of claim 6, and further comprising:

a first deflector disposed proximate the outlet end of the first delivery conduit and having a deflecting surface positioned to deflect the particulate material to the agricultural surface through the first dispersal area.

8. The agricultural spreader of claim 7, and further comprising:

a second deflector disposed proximate the outlet end of the second delivery conduit and having a deflecting surface positioned to deflect the particulate material to the agricultural surface through the second dispersal area.

9. The agricultural spreader of claim 8 wherein the controller is configured to detect plugging proximate the first deflector based on a first output from the RF receiver indicative of the received first RF signal and to detect plugging proximate the second deflector based on a second output from the RF receiver indicative of the received second RF signal.

10. The agricultural spreader of claim 6, wherein the controller is configured to generate an action signal based on the detection, to control a controllable system based on the detection.

11. The agricultural spreader of claim 10, wherein the controller is configured to generate the action signal to control the airflow through the first and second delivery conduits based on the detection.

12. A method of controlling an agricultural spreader, comprising:

controlling a fan to generate airflow that carries particulate material through a first delivery conduit from an inlet end that receives the particulate material to an outlet end, through which the particulate material exits the first delivery conduit and is directed to an agricultural surface through a corresponding first dispersal area and that carries particulate material through a second delivery conduit from an inlet end that receives the particulate material to an outlet end, through which the particulate material exits the second delivery conduit and is directed to the agricultural surface through a corresponding second dispersal area;

generating a first radio frequency (RF) signal, with a first RF transmitter, that passes through the first dispersal area, the first RF signal being detectably changed when interacting with the particulate material traveling through the first dispersal area;

generating a second RF signal, with a second RF transmitter, that passes through the second dispersal area, the second RF signal being detectably changed when interacting with the particulate material traveling through the second dispersal area;

receiving, with an RF receiver, the first RF signal after the first RF signal passes through the first dispersal area and the second RF signal after the second RF signal passes through the second dispersal area;

providing a first output, from the RF receiver, indicative of the received first RF signal and a second output, from the RF receiver, indicative of the received second RF signal; and detecting a plug condition in one or more of the First delivery conduit and the second delivery conduit based on one or more of the first output and the second output.

13. The method of claim 12, wherein controlling a fan comprises:

controlling the fan to generate airflow that carries particulate material through a plurality of delivery conduits from an inlet end corresponding to each delivery conduit, that receives the particulate material, to an outlet end corresponding to each delivery conduit, through which the particulate material exits the corresponding delivery conduit and is directed to an agricultural surface through a corresponding dispersal area.

14. The method of claim 13 and further comprising:

generating a respective RF signal with each one of a plurality of different RF transmitters, each separate respective RF signal passing through a corresponding one dispersal area of a corresponding one delivery conduit of the plurality of delivery conduits; and receiving, with the RF receiver, each separate respective RF signal after each separate respective RF signal passes through the corresponding one dispersal area.

15. The method of claim 12 and further comprising:

positioning the RF receiver on the agricultural spreader such that at least a portion of the first dispersal area is physically located between the RF receiver and the first RF transmitter and at least a portion of the second dispersal area is physically located between the RF receiver and the second RF transmitter.

16. The method of claim 12 and further comprising:

generating an action signal to control a controllable system on the agricultural spreader based on the detected plug condition.

17. The method of claim 16, wherein generating an action signal comprises:

controlling the fan to vary the airflow through the first and second delivery conduits based on the detected plug condition.

18. An agricultural spreader, comprising:

a storage bin that stores a particulate material to be spread onto an agricultural surface;

a boom that has a plurality of delivery conduits, each with an inlet end proximate the storage bin and a corresponding outlet end;

a fan that generates airflow through the plurality of delivery conduits to carry particulate matter from the inlet end of each delivery conduit to the corresponding outlet end;

a plurality of deflectors, each deflector, of the plurality of deflectors, corresponding to a delivery conduit and being mounted proximate the outlet end of the corresponding delivery conduit to deflect particulate matter exiting the outlet end of the corresponding delivery conduit, through a dispersal area, corresponding to the deflector, onto the agricultural surface;

a first radio-frequency (RF) transmitter disposed to generate a first RF signal that passes through the dispersal area corresponding to a first deflector of the plurality of deflectors, wherein the first RF signal is detectably changed when interacting with the particulate material passing through the dispersal area corresponding to the first deflector;

a second RF transmitter disposed to generate a second RF signal that passes through the dispersal area corresponding to a second deflector of the plurality of deflectors, wherein the second RF signal is detectably changed when interacting with the particulate matter passing through the dispersal area corresponding to the second deflector;

an RF receiver configured to receive the first RF signal after the first RF signal passes through the dispersal area corresponding to the first deflector and the second RF signal after the second RF signal passes through the dispersal area corresponding to the second deflector and provide an output indicative thereof; and a controller coupled to the RF receiver and configured to detect a plug condition of at least one of the plurality of delivery conduits based on the output of the RF receiver.

19. The agricultural spreader of claim 18, and further comprising a controllable system, wherein the controller is configured to generate and action signal to control the controllable system on the agricultural spreader based on the detected plug condition.

20. The agricultural spreader of claim 19, wherein the controllable system comprises an operator interface mechanism and wherein the controller is configured to generate the action signal to control the operator interface mechanism to generate an alert indicative of the plug condition.

* * * * *